US010531297B2

(12) United States Patent
Wang

(10) Patent No.: US 10,531,297 B2
(45) Date of Patent: Jan. 7, 2020

(54) AUTHENTICATION METHOD AND SERVER, AND COMPUTER STORAGE MEDIUM

(71) Applicant: TENCENT TECHNOLOGY (SHENZHEN) COMPANY LIMITED, Shenzhen (CN)

(72) Inventor: Fugen Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/194,483

(22) Filed: Nov. 19, 2018

(65) Prior Publication Data

US 2019/0090133 A1 Mar. 21, 2019

Related U.S. Application Data

(63) Continuation of application No. PCT/CN2017/099363, filed on Aug. 28, 2017.

(30) Foreign Application Priority Data

Aug. 29, 2016 (CN) .......................... 2016 1 0757203

(51) Int. Cl.
*H04W 12/06* (2009.01)
*H04L 29/06* (2006.01)
(Continued)

(52) U.S. Cl.
CPC ......... *H04W 12/06* (2013.01); *H04L 63/0884* (2013.01); *H04L 63/108* (2013.01);
(Continued)

(58) Field of Classification Search
CPC ....... H04W 12/06; H04W 12/08; H04W 8/18; H04W 8/26; H04W 84/12; H04L 63/0884;
(Continued)

(56) References Cited

U.S. PATENT DOCUMENTS

2013/0247164 A1  9/2013  Hoggan

FOREIGN PATENT DOCUMENTS

| CN | 102378175 A | 3/2012 |
| CN | 105101203 A | 11/2015 |
| CN | 106131079 A | 11/2016 |

OTHER PUBLICATIONS

The World Intellectual Property Organization (WIPO) International Search Report for PCT/CN2017/099363 dated Nov. 20, 2017, 5 Pages (including translation).

*Primary Examiner* — Wayne H Cai
(74) *Attorney, Agent, or Firm* — Anova Law Group, PLLC

(57) ABSTRACT

An authentication method includes: receiving, by an authentication server, a second request from a terminal requesting to access a redirection address. The second request carries hardware information of the terminal, and the redirection address is obtained by the terminal from a proxy server in response to the terminal initiating a first request to a to-be-accessed address. The authentication server generates a first identification parameter according to the hardware information, and sends the first identification parameter to the terminal. The terminal initiates a third request used for authentication to the proxy server according to the first identification parameter. The authentication server receives a fourth request from the proxy server to verify validity of the first identification parameter, and informs the proxy server that the authentication request is approved when verification of the first identification parameter succeeds. The proxy server facilitates the terminal to visit the to-be-accessed address.

20 Claims, 9 Drawing Sheets

(51) Int. Cl.
*H04L 29/08* (2006.01)
*H04W 12/08* (2009.01)
H04L 29/12 (2006.01)
H04W 8/18 (2009.01)
H04W 8/26 (2009.01)
H04W 84/12 (2009.01)

(52) U.S. Cl.
CPC .......... *H04L 63/12* (2013.01); *H04L 67/2814* (2013.01); *H04W 12/08* (2013.01); *H04L 61/6022* (2013.01); *H04W 8/18* (2013.01); *H04W 8/26* (2013.01); *H04W 84/12* (2013.01)

(58) Field of Classification Search
CPC ... H04L 63/12; H04L 63/108; H04L 67/2814; H04L 61/6022
See application file for complete search history.

AUTHENTICATION METHOD AND SERVER, AND COMPUTER STORAGE MEDIUM

RELATED APPLICATION

This application is a continuation application of PCT Patent Application No. PCT/CN2017/099363, filed on Aug. 28, 2017, which claims priority to Chinese Patent Application No. 201610757203.4, filed on Aug. 29, 2016, the entire contents of both of which are incorporated herein by reference.

FIELD OF THE TECHNOLOGY

The present disclosure relates to communications technologies, and in particular, to an authentication method, an authentication server, and a computer storage medium.

BACKGROUND OF THE DISCLOSURE

With the development of intelligent terminals and Internet technologies, users can access a network at any time at any place where a WiFi hotspot is available or a mobile data network (such as 2G, 3G, or 4G) is connected, so as to provide convenient life services by using various applications installed on the intelligent terminals.

Currently, an increasing number of merchants can provide free WiFi services to users, so that customers can access a wireless network and enjoy various online services at any time after entering shops. There are the following several implementation solutions:

Solution 1: Account information for a WiFi login is displayed at a relatively distinctive position in the premises, for example, on a menu or on a wall in the shop. Disadvantages of this solution are: Users need to manually connect WiFi of merchants and manually input the account information used for the WiFi login. In addition to such complex interaction manner, the account information is very prone to be wrongly input.

Solution 2: An increasing number of merchants have their own official accounts. Currently, the official account is an operation mode of we-media. The merchants can promote their own service information by using the official accounts. As shown in FIG. 1 and FIG. 2, FIG. 1 and FIG. 2 are schematic diagrams of implementing a WiFi login by following an official account of a merchant. Account information for the WiFi login is obtained by using a keyword of the official account. Disadvantages of this solution are: Although the WiFi login can be implemented by way of following, information obtained by way of following is actually the account information used for the WiFi login, for example, a user name "XXXXXXX" and a password "YYY", but a user copies and pastes the account information, with no need to input the account information word by word. Compared with Solution 1, this solution is not improved essentially, and an interaction manner is still relatively complex.

Solution 3: Similar to Solution 2, an official account of a merchant is still used. As shown in FIG. 3, FIG. 3 is a schematic diagram of implementing a WiFi login by following an official account of a merchant. After a login is performed successfully by using a WiFi connection on WeChat, the official account is followed in an optional manner, and following the official account is not a requirement. Disadvantages of this solution are: The WiFi login needs to be implemented by using a specialized application (for example, WeChat). Although there is no need to manually input login information, an interaction manner is restricted. If the specialized application (for example, WeChat) is not installed, the solution actually cannot be used.

For the foregoing problem, there is no effective solution in the related technology.

SUMMARY

In view of this, embodiments of the present disclosure provide an authentication method and system, a proxy server, and a computer storage medium, so as to at least resolve a problem in the existing technology.

Technical solutions of the embodiments of the present disclosure are implemented as follows:

An embodiment of the present disclosure provides an authentication method. The method includes: receiving, by an authentication server, a second request from a terminal requesting to access a redirection address. The second request carries hardware information of the terminal, and the redirection address is obtained by the terminal from a proxy server in response to the terminal initiating a first request to a to-be-accessed address on a browser page. The authentication server generates a first identification parameter according to the hardware information; and sends the first identification parameter to the terminal. The terminal initiates a third request used for authentication to the proxy server according to the first identification parameter. The authentication server receives a fourth request from the proxy server, the fourth request being an authentication request to verify validity of the first identification parameter; and informs the proxy server that the authentication request is approved when verification of the first identification parameter succeeds. The proxy server facilitates the terminal to visit the to-be-accessed address in the first request.

An embodiment of the present disclosure provides an authentication server, including a memory and a processor coupled to the memory. The processor is configured to: receive a second request from a terminal requesting to access a redirection address. The second request carries hardware information of the terminal, and the redirection address is obtained by the terminal from a proxy server in response to the terminal initiating a first request to a to-be-accessed address on a browser page. The processor generates a first identification parameter according to the hardware information; and sends the first identification parameter to the terminal. The terminal initiates a third request used for authentication to the proxy server according to the first identification parameter. The processor receives a fourth request from the proxy server, the fourth request being an authentication request to verify validity of the first identification parameter; and informs the proxy server that the authentication request is approved when verification of the first identification parameter succeeds. The proxy server facilitates the terminal to visit the to-be-accessed address in the first request.

An embodiment of the present disclosure provides a non-transitory computer-readable storage medium that stores computer program instructions. The instructions are executable by at least one processor to perform: receiving a second request from a terminal requesting to access a redirection address. The second request carries hardware information of the terminal, and the redirection address is obtained by the terminal from a proxy server in response to the terminal initiating a first request to a to-be-accessed address on a browser page. The computer program instructions further cause the at least one processor to generate a first identification parameter according to the hardware information; and send the first identification parameter to the terminal. The terminal initiates a third request used for authentication to the proxy server according to the first identification parameter. The computer program instructions further cause the at least one processor to receive a fourth request from the proxy server, the fourth request being an authentication request to verify validity of the first identification parameter; and inform the proxy server that the authentication request is approved when verification of the first identification parameter succeeds. The proxy server facilitates the terminal to visit the to-be-accessed address in the first request.

It can be learned that according to the embodiments of the present disclosure, an authentication login operation for a network access is simplified, and a temporary authentication state or a permanent authentication state is conveniently switched to according to a user operation, thereby greatly improving the efficiency of an authentication process.

DESCRIPTION OF EMBODIMENTS

Figure 1:
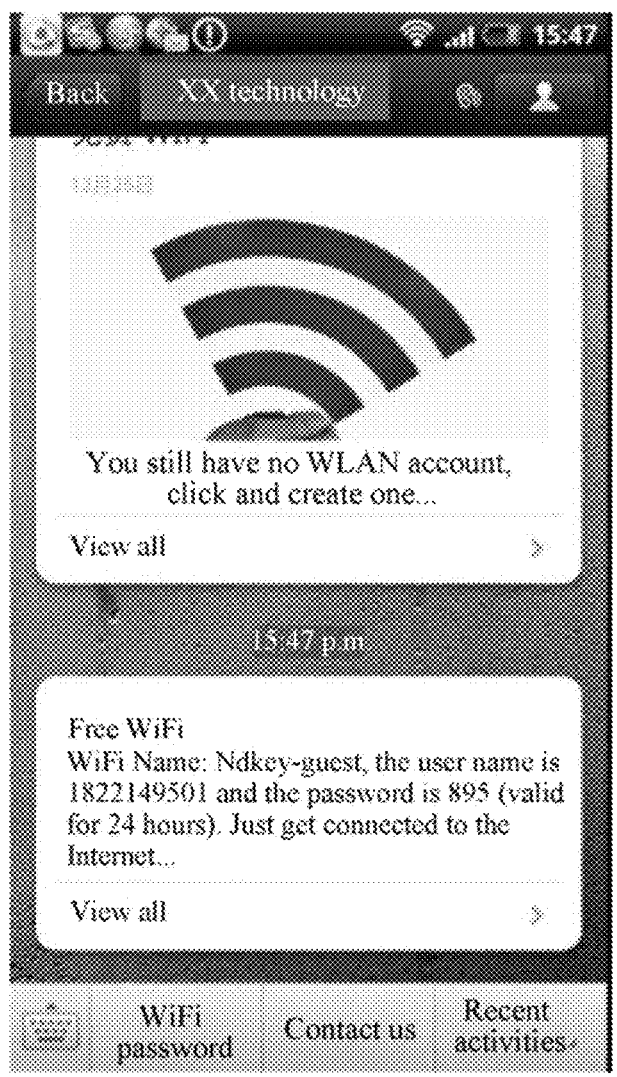
FIG. 1 and FIG. 2 are schematic diagrams of implementing a WiFi login by following an official account of a merchant in the existing technology.

The following further describes implementation of the technical solutions in detail with reference to the accompanying drawings.

The mobile terminal according to various embodiments of the present disclosure will now be described with reference to the accompanying drawings. In subsequent descriptions, a suffix such as "module", "component", or "unit" used for representing an element is used only for describing the embodiments of the present disclosure, and does not have any particular meanings. Therefore, "module" and "component" can be exchangeable.

In the following detailed descriptions, numerous specific details are provided to provide a thorough understanding of the present disclosure. However, a person of ordinary skill in the art may implement the present disclosure without the specific details. In other cases, well-known methods, processes, components, circuits, and networks are not described in detail to avoid unnecessarily obscuring aspects of the embodiments.

In addition, although the terms "first" and "second" are used for many times in this specification to describe various elements (or various thresholds, various applications, various instructions, or various operations), these elements (or thresholds, applications, instructions, or operations) should not be limited by these terms. These terms are only used to distinguish one element (or threshold, application, instruction, or operation) from another element (or threshold, application, instruction, or operation). For example, a first operation can be referred to as a second operation, and a second operation can also be referred to as a first operation, which do not depart from the scope of the present disclosure. Both the first operation and the second operation are operations, only they are different operations.

Steps in the embodiments of the present disclosure do not have to be processed in a described sequence. The steps may be selectively disarranged and rearranged according to a requirement, or a step may be added to or deleted from the steps in the embodiments. The steps in the embodiments of the present disclosure are merely described in an optional sequence combination, and do not represent all sequence combinations of the steps in the embodiments of the present disclosure. The sequence of the steps in the embodiments cannot be construed as a limit to the present disclosure.

The term "and/or" in the embodiments of the present disclosure indicates any or all possible combinations of one or more listed associated items. It should be further noted that when used in this specification, "include/comprise" specifies the presence of stated features, integers, steps, operations, elements, and/or components, but do not preclude the presence or addition of one or more other features, integers, steps, operations, elements, components, and/or a combination thereof.

An intelligent terminal (for example, a mobile terminal) in the embodiments of the present disclosure can be implemented in various forms. For example, the intelligent terminal described in the embodiments of the present disclosure may include mobile terminals such as a mobile phone, a smart phone, a notebook computer, a digital broadcast receiver, a personal digital assistant (PDA), a tablet computer (PAD), a portable media player (PMP), and a navigation apparatus and stationary terminals such as a digital TV and a desktop computer. In the following, it is assumed that the terminal is a mobile terminal. However, a person skilled in the art may understand that the configuration according to the implementations of the present disclosure can be also applicable to the fixed types of terminals, except for any elements especially configured for a mobile purpose.

Figure 4:
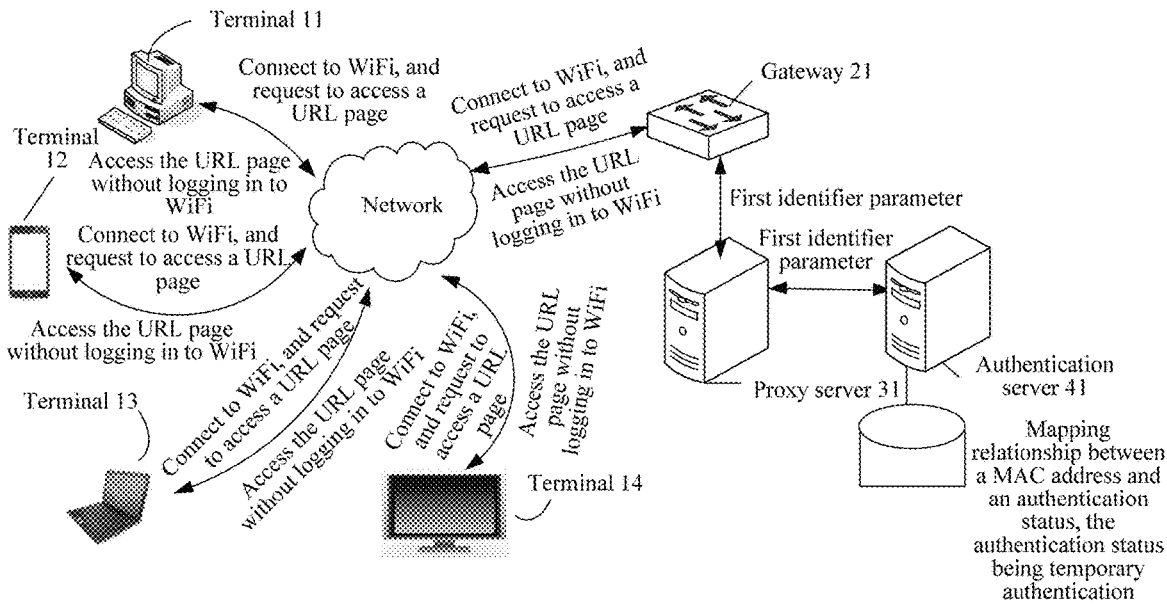
FIG. 4 is a schematic diagram of hardware entities performing information exchange during temporary authentication according to an embodiment of the present disclosure.

FIG. 4 is a schematic diagram of hardware entities performing information exchange according to an embodiment of the present disclosure. Embodiments of the present disclosure are applicable to a WiFi authentication scenario or another scenario in which authentication needs to be performed, for example, an authentication scenario of near-field communication or Bluetooth access. The schematic diagram shows an information processing process during temporary WiFi authentication. FIG. 4 includes terminal devices 11 to 14, a gateway 21, a proxy server 31, and an authentication server 41. The terminal devices 11 to 14 perform information exchange with various servers by using a wired network or a wireless network. The terminal device includes a mobile phone, a desktop computer, a PC, an all-in-one PC, or the like. According to embodiments of the present disclosure, a terminal is connected to WiFi, and a browser page is displayed on the terminal side. A first request is initiated by inputting a to-be-accessed address (for example, a URL of the to-be-accessed address) on the browser page. After receiving the first request, the proxy server returns a redirection response carrying a redirection address to the terminal according to the first request, and prompts/instructs, by using the redirection response, the terminal to redirect to a WiFi login page to be authenticated before accessing a URL page. The terminal initiates a second request of obtaining the WiFi login page to the authentication server, the second request carrying hardware information of the terminal. For the second request, the authentication server does not return the WiFi login page to the terminal, but obtains the hardware information from the second request and generates a first identification parameter for the terminal according to the hardware information. An attribute of the first identification parameter may be a temporary parameter. The temporary parameter means that the parameter is valid in a specified time. The terminal, the proxy server, and the authentication server interact with each other based on the first identification parameter, to verify validity of the first identification parameter. When the first identification parameter is valid, the WiFi login is authenticated, so that the terminal can implement a WiFi login without inputting WiFi login account information, and finally directly access the URL page. That the terminal, the proxy server, and the authentication server interact with each other based on the first identification parameter, to verify validity of the first identification parameter means: The terminal initiates a third request used for authentication to the proxy server according to the first identification parameter; the proxy server regularly requests, by using the first identification parameter, the authentication server to verify the validity of the first identification parameter; and when the first identification parameter is valid, the WiFi login is authenticated, so that the terminal can directly access the URL page. In this case, an authentication status corresponding to a MAC address is updated in the authentication server, and the authentication status is updated from unauthenticated/unauthorized to temporary authentication. If a time that the terminal requests access through the WiFi is in the specified time, the first identification parameter is valid, and the terminal can directly access the URL page without logging in to the WiFi. If a time that the terminal requests access through the WIFI exceeds the specified time, the first identification parameter is invalid, and a WiFi login is interrupted. The WiFi can be relogged in to by performing the foregoing information exchange process again. Further, after the authentication server determines, according to the verification result, that the first identification parameter is valid and the WiFi login authentication is successful, the proxy server determines, according to a preset condition, whether the first identification parameter is invalid, the preset condition including whether a connection time exceeds a specified time and whether the terminal follows a corresponding official account. If the terminal follows the corresponding official account in the specified time, the authentication status corresponding to the MAC address is updated in the authentication server, and the authentication status is updated from temporary authentication to permanent authentication. An example of the authentication status is: unauthenticated is represented by 0, temporary authentication is represented by 1, and permanent authentication is represented by 2. The present disclosure is not limited to the specific example herein, as long as the authentication status corresponding to the MAC address is updated in a mapping relationship stored in the authentication server, which indicates that the authentication status changes. The change of the authentication status affects validity of the first identification parameter.

Figure 5:
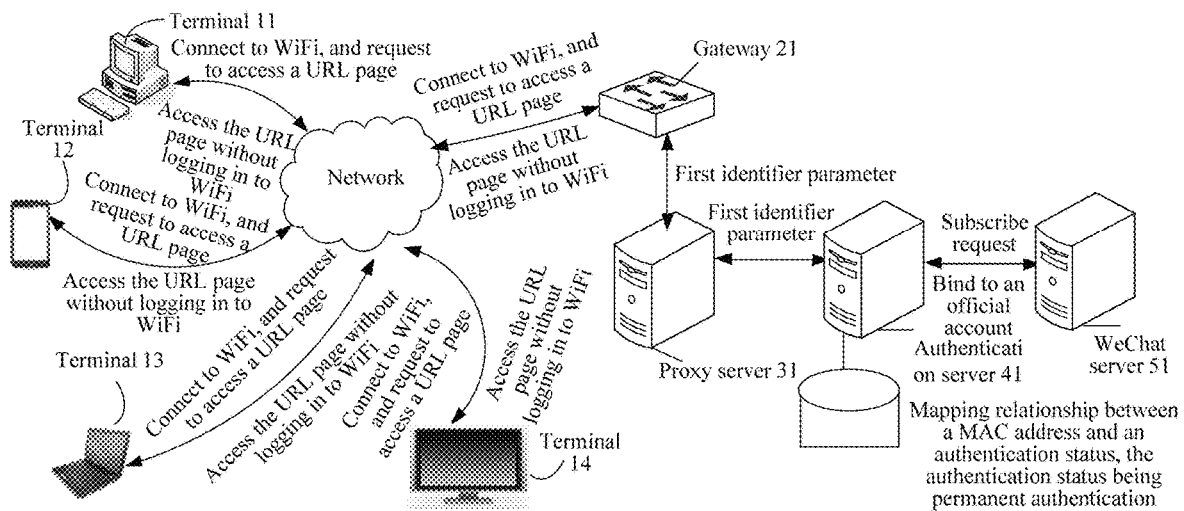
FIG. 5 is a schematic diagram of hardware entities performing information exchange during permanent authentication according to an embodiment of the present disclosure.

FIG. 5 is a schematic diagram of hardware entities performing information exchange according to an embodiment of the present disclosure. Embodiments of the present disclosure are applicable to a WiFi authentication scenario or another scenario in which authentication needs to be performed, for example, an authentication scenario of near-field communication or Bluetooth access. The schematic diagram shows an information processing process during permanent WiFi authentication. FIG. 5 includes terminal devices 11 to 14, a gateway 21, a proxy server 31, an authentication server 41, and a WeChat server 51. The terminal devices 11 to 14 perform information exchange with various servers by using a wired network or a wireless network. The terminal device includes a mobile phone, a desktop computer, a PC, an all-in-one PC, or the like. According to embodiments of the present disclosure, a terminal is connected to WiFi, and a browser page is displayed on the terminal side. A first request is initiated by inputting a to-be-accessed address (for example, a URL of the to-be-accessed address) on the browser page. After receiving the first request, the proxy server returns a redirection response carrying a redirection address to the terminal according to the first request, and prompts, by using the redirection response, the terminal to redirect to a WiFi login page to be authenticated before accessing a URL page. The terminal initiates a second request of obtaining the WiFi login page to the authentication server, the second request carrying hardware information of the terminal. For the second request, the authentication server does not return the WiFi login page to the terminal, but obtains the hardware information from the second request and generates a first identification parameter for the terminal according to the hardware information. An attribute of the first identification parameter may be a temporary parameter. The terminal, the proxy server, and the authentication server interact with each other based on the first identification parameter, to verify validity of the first identification parameter. When the first identification parameter is valid, the WiFi login is authenticated, so that the terminal can implement a WiFi login without inputting WiFi login account information, and finally directly access the URL page. After the WiFi login is authenticated, if a subscribing event is generated by following an official account on a terminal application, the first identification parameter is kept valid, and a connection state is remained in; otherwise, the first identification parameter is invalidated, and a connection state is interrupted. During actual application, a subscribing request may be generated according to the subscribing event, and the subscribing request is sent to the authentication server. The authentication server generates media information and link information according to the subscribing request, and forwards the media information and the link information to the terminal by using an application platform (for example, the WeChat server). The application platform may be maintained by a social networking service (SNS) provider or instante messaging service provider, such as WeChat. The merchant may register an account with the service provider. The merchant's account can be subscribed by other users. In this way, when the merchant posts promotions and activities on the account, the subscribers of the merchant on the SNS network may receive related information. The merchant may also set up its router/gateway and/or the proxy server with the redirection address corresponding to the authentication server to implement the disclosed method. The terminal triggers a specified operation for the link information according to the media information, enters a page of a WeChat official account of a merchant, and completes, based on official account following, authentication on the page of WeChat official account of the merchant. That the terminal, the proxy server, and the authentication server interact with each other based on the first identification parameter, to verify validity of the first identification parameter means: The terminal initiates a third request used for authentication to the proxy server according to the first identification parameter; the proxy server regularly requests, by using the first identification parameter, the authentication server to verify the validity of the first identification parameter; and when the first identification parameter is valid, the WiFi login is authenticated, so that the terminal can directly access the URL page. In this case, because the official account of the merchant is followed, an authentication status corresponding to a MAC address is updated to permanent authentication in the authentication server. For the permanent authentication, a WiFi login interruption in a case of timeout does not exist. A connection is always remained if the WiFi is logged in to.

It should be noted that after the authentication server determines, according to the verification result, that the first identification parameter is valid and the WiFi login authentication succeeds, the proxy server determines, according to a preset condition, whether the first identification parameter is invalid, the preset condition including whether a connection time exceeds a specified time and whether the terminal follows a corresponding official account. If the terminal follows the corresponding official account in the specified time, the authentication status corresponding to the MAC address is updated in the authentication server, and the authentication status is updated from temporary authentication to permanent authentication. An example of the authentication status is: unauthenticated is represented by 0, temporary authentication is represented by 1, and permanent authentication is represented by 2. The present disclosure is not limited to the specific example herein, as long as the authentication status corresponding to the MAC address is updated in a mapping relationship stored in the authentication server, which indicates that the authentication status changes. The change of the authentication status affects validity of the first identification parameter.

The examples of FIG. 4 and FIG. 5 are only system architecture examples of the embodiments of the present disclosure. The embodiments of the present disclosure are not limited to the system structures in FIG. 4 and FIG. 5. Based on the system architectures in FIG. 4 and FIG. 5, the following embodiments are provided for a method in the present disclosure.

Some embodiments of the present disclosure are applicable to a WiFi authentication scenario or another scenario in which authentication needs to be performed, for example, an authentication scenario of near-field communication or Bluetooth access. Various specific implementation solutions in the following embodiment are specifically described by using a WiFi login authentication scenario as an example.

Figure 6:
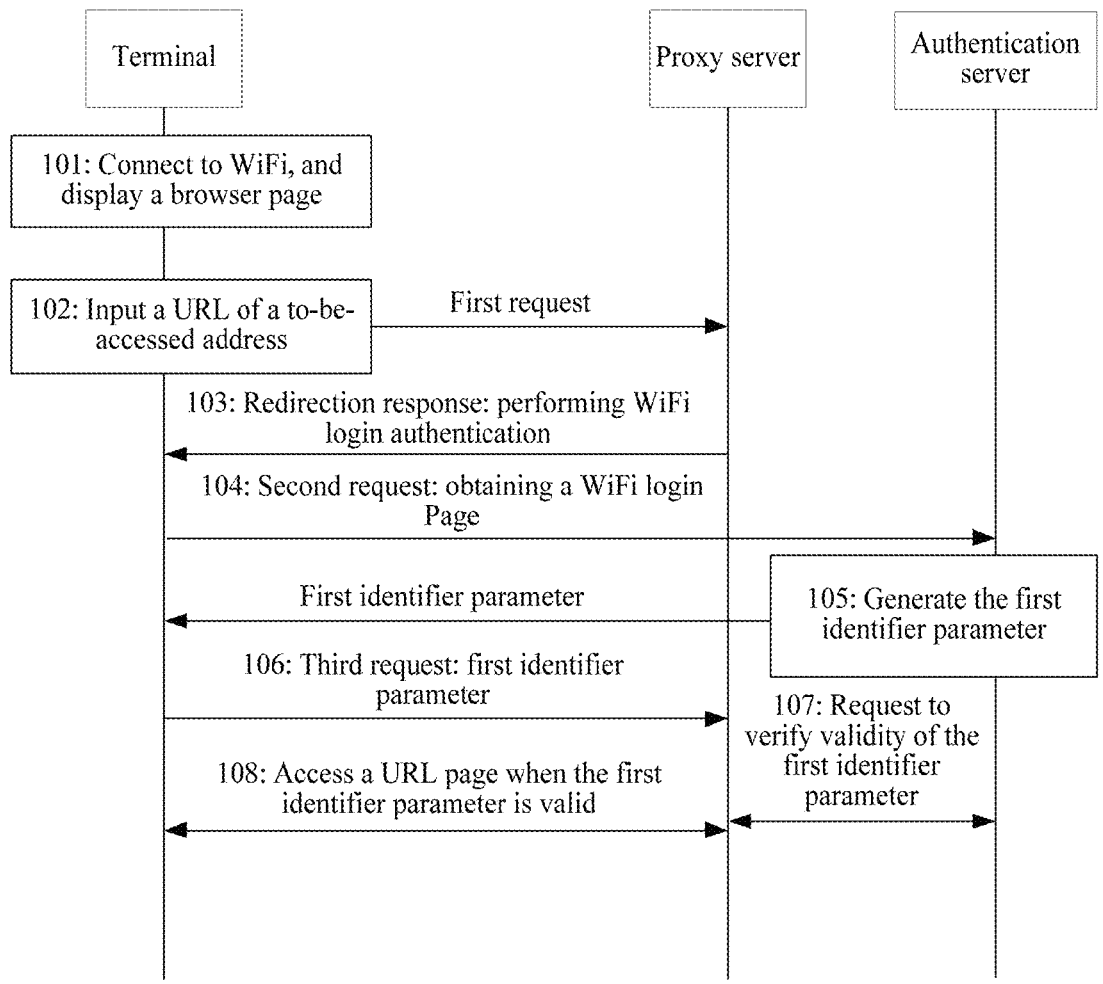
FIG. 6 is a schematic diagram of interaction between a terminal and a server according to an embodiment of the present disclosure.

An embodiment of the present disclosure provides an information processing method. As shown in FIG. 6, the method includes the following steps: A terminal is connected to WiFi, and a browser page is displayed on the terminal side (101). One example is: In a scenario in which a user is in a waiting hall of an airport, the user can find a WiFi hotspot for China Mobile or China Unicom or a free WiFi hotspot set for the airport. In this case, after the WiFi hotspot is selected and connected, the user terminal can be directed to a login page. However, in existing technology, the login page is to inform the user that a current connection to the WiFi hotspot is not considered as a successful WiFi login. If no account information for logging in to WiFi is entered in the login page or if entered information is not successfully verified, the user terminal cannot achieve a networking need (e.g., accessing the internet through the connected WiFi). That is, in this case, authentication of a WiFi login actually fails. Therefore, the user terminal cannot access another URL page through WiFi networking. In the existing technology, a free WiFi hotspot set for the airport is used as an example. A WiFi login can be implemented by inputting, on the login page, account information for logging in to WiFi, such as a serial number of a ticket or a phone number for purchasing a ticket, as well as a verification code. If the inputted information is successfully verified, the user terminal can access the internet service through the connected WiFi hotspot, thereby accessing another URL page. In embodiments of the present disclosure, a WiFi login can be implemented without manually inputting the account information for logging in to WiFi. A first request is initiated by inputting a URL of a to-be-accessed address on the browser page (102). After receiving the first request, a proxy server returns a redirection response to the terminal, the redirection response being used for prompting the terminal to redirect to a WiFi login page to be authenticated before accessing a URL page (103). Herein, a current connection to the WiFi hotspot is not considered as a successful WiFi login. The terminal needs to redirect to the WiFi login page for authentication before gaining access to internet service through the WiFi hotspot. In this case, the terminal initiates a second request of obtaining the WiFi login page to an authentication server (104). The authentication server does not return the WiFi login page to the terminal. Therefore, the terminal user does not need to input the account information for logging in to the WiFi, to implement the WiFi login. The authentication server generates, for the second request when an identity of the terminal is not verified, a first identification parameter for the terminal, an attribute of the first identification parameter being a temporary parameter (105). An example of the first identification parameter is a temporary token parameter. A token refers to a (temporary) token in computer identity authentication, and is also referred to as an identifier for marking an identity authentication status. The authentication server does not return the WiFi login page to the terminal to request the user to input a user name and a password, but directly generates a temporary token parameter without verifying the identity of the user. Therefore, subsequently, the terminal, the proxy server, and the authentication server perform a series of interactions to implement an automatic WiFi login based on the temporary token parameter. Specifically, the terminal initiates a third request used for authentication to the proxy server according to the first identification parameter (106). The proxy server regularly requests, by using the first identification parameter, the authentication server to verify the validity of the first identification parameter (107). When the first identification parameter is valid, the WiFi login is authenticated, so that the terminal can directly access the URL page (108).

According to some embodiments of the present disclosure, because for the second request of the terminal of obtaining the WiFi login page, the authentication server actually does not return the WiFi login page to the terminal, a case in which the terminal inputs the account information including an account and a password on the login page does not exist. Specifically, the login is automatically authenticated depending on a series of interaction verifications based on the first identification parameter (for example, a temporary token parameter) and among the terminal, the proxy server, and the authentication server in the foregoing information exchange process. In the entire information processing process, the user can try WiFi of a merchant for free in a short time without any keyboard input. Because the WiFi login is automatically implemented by using the first identification parameter such as the temporary token parameter, after a specified time expires, if an official account of the merchant is still not followed, the temporary token parameter becomes invalid. The WiFi of the merchant can continue to be tried only when a portal (Portal) page is accessed again. The portal is a Web authentication manner. The terminal does not need to perform access with a specialized application and just needs to have a browser. Therefore, a WiFi access and networking requirement of the terminal such as a mobile phone can be conveniently implemented. In a public place, there are many WiFi hotspots. WiFi is not encrypted. However, in prior art, when a user is to access a network, the user needs to input WiFi-related account information such as a user name and a password, and can have access to a network after authentication succeeds. Embodiments of the present disclosure provide improved portal authentication. The login is automatically authenticated based on interaction verification of the first identification parameter (for example, the temporary token parameter), and the user does not need to input the WiFi-related account information such as the user name and the password. The attribute of the first identification parameter is a temporary parameter. After a validity time of the first identification parameter expires, the first identification parameter becomes invalid, and the WiFi login is automatically exited. According to embodiments of the present disclosure, not only a WiFi login operation but also a WiFi login exiting operation becomes simple and efficient. In addition, a temporary authentication status or a permanent authentication status can be simply switched depending on an operation of the user, thereby greatly improving the efficiency of the authentication process.

In an implementation of some embodiments of the present disclosure, the redirection response includes at least the Media Access Control (MAC) address of the terminal and the URL of the to-be-accessed address. Information about the MAC address and the URL of the to-be-accessed address is locked, so that the proxy server can enable, according to the information, a URL page access right for the terminal corresponding to the MAC address when the proxy server sets a firewall rule subsequently.

In an implementation of some embodiments of the present disclosure, the authentication status includes at least one of unauthenticated, temporary authentication, and permanent authentication. Based on such different authentication statuses such as the unauthenticated state, the temporary authentication state, and the permanent authentication state, the proxy server can modify the set firewall rule. For example, for the unauthenticated state, the proxy server limits or shields the URL page access right for the terminal corresponding to the MAC address. For example, for the temporary authentication state, the proxy server enables, in a specified time, the URL page access right for the terminal corresponding to the MAC address, and deletes, if the terminal still does not follow the official account of the merchant after the specified time expires, the URL page access right enabled for the terminal corresponding to the MAC address, to interrupt the WiFi login. For example, for the permanent authentication state, the proxy server permanently enables the URL page access right for the terminal corresponding to the MAC address.

In an implementation of some embodiments of the present disclosure, a mapping relationship is established between the MAC address of the terminal and the authentication status, and the mapping relationship is locally stored in the authentication server. The authentication status includes at least one of unauthenticated, temporary authentication, and permanent authentication. When the mapping relationship between the MAC address of the terminal and the authentication status is locally stored in the authentication server, whether the authentications status is unauthenticated or authentication (temporary authentication or permanent authentication) is determined according to whether the first identification parameter (for example, the temporary token parameter) used for interaction verification and submitted by the terminal is valid. For two cases of authentication (temporary authentication and permanent authentication), when the first identification parameter (for example, the temporary token parameter) is valid, the authentications status corresponding to the MAC address is updated to temporary authentication. The authentications status is updated depending on whether the terminal user follows the official account of the merchant. If the terminal user follows the official account of the merchant, the authentications status corresponding to the MAC address is updated to permanent authentication.

An embodiment of the present disclosure provides an information processing method. The method includes the following steps: A terminal is connected to WiFi, and a browser page is displayed on the terminal side. One example is: In a scenario in which a user is in a waiting hall of an airport, the user can find a WiFi hotspot for China Mobile or China Unicom or a free WiFi hotspot set for the airport. In this case, after the WiFi hotspot is selected and connected, the user terminal can be directed to a login page. However, in existing technology, the login page is to inform the user that a current connection to the WiFi hotspot is not considered as a successful WiFi login. If no account information for logging in to WiFi is entered in the login page or if entered information is not successfully verified, the user terminal cannot achieve a networking need (e.g., accessing the internet through the connected WiFi). That is, in this case, authentication of a WiFi login actually fails. Therefore, the user terminal cannot access another URL page through WiFi networking. In the existing technology, a free WiFi hotspot set for the airport is used as an example. A WiFi login can be implemented by inputting, on the login page, account information for logging in to WiFi, such as a serial number of a ticket or a phone number for purchasing a ticket, as well as a verification code. If the inputted information is successfully verified, the user terminal can access the internet service through the connected WiFi hotspot, thereby accessing another URL page. In embodiments of the present disclosure, a WiFi login can be implemented without manually inputting the account information for logging in to WiFi. A first request is initiated by inputting a URL of a to-be-accessed address on the browser page. After receiving the first request, a gateway (that is, a router) routes, according to a corresponding firewall rule, the first request to a port on which a proxy server is located on the local gateway. After receiving the first request, the proxy server returns a redirection response to the terminal. For example, the proxy server provides an HTTP redirection reply, to redirect to a Web login page. A query string (QueryString) for redirection includes an ID (gwID) of the gateway, an address (gwIP) of the gateway, a port (gwPort) of the gateway, a MAC address of the gateway, and a URL of an address of a page currently accessed by the user. The redirection response is used to prompt the terminal to redirect to the WiFi login page to be authenticated. Herein, a current connection to the WiFi hotspot is not considered as a successful WiFi login, that is, another URL page (e.g., associated with Internet service) cannot be accessed, and the terminal needs to redirect to the WiFi login page. In this case, the terminal initiates a second request of obtaining the WiFi login page to an authentication server. The authentication server does not return the WiFi login page to the terminal. Therefore, the terminal user does not need to input the account information for logging in to the WiFi, to implement the WiFi login. The authentication server generates, for the second request when an identity of the terminal user is not verified, a first identification parameter for the terminal user, an attribute of the first identification parameter being a temporary parameter. An example of the first identification parameter is a temporary token parameter. A token refers to a (temporary) token in computer identity authentication, and is also referred to as an identifier for marking an identity authentication status. The authentication server does not return the WiFi login page to the terminal to request the user to input a user name and a password, but directly generates a temporary token parameter without verifying the identity of the user. Therefore, subsequently, the terminal, the proxy server, and the proxy server perform a series of interactions to implement an automatic WiFi login based on the temporary token parameter.

By means of a series of interactions among the terminal, the proxy server, and the proxy server, an automatic WiFi login is implemented based on the temporary token parameter. A specific implementation includes: The proxy server receives the third request, parses out the temporary token parameter from the third request, and encapsulates the temporary token parameter into a fourth request used for authentication. The proxy server sends the fourth request to the authentication server, to request to verify validity of the temporary token parameter. That is, the proxy server needs to request to verify whether the temporary token parameter is a valid token parameter generated by the authentication server. The authentication server returns a verification result (for example, a return code corresponding to the temporary token parameter) for the temporary token parameter to the proxy server, so as to verify the validity of the temporary token parameter. The WiFi login is authenticated when the temporary token parameter is valid, so that the terminal can directly access the URL page. For ease of description, the temporary token parameter is referred to as a token parameter for short below.

Herein, for the verification result for the token parameter, the verification result is used to indicate whether the token parameter is the valid token parameter generated by the authentication server. A specific implementation is: If the token parameter has validity, the token parameter is the valid token parameter generated by the authentication server. If the token parameter has no validity, the token parameter is not the valid token parameter generated by the authentication server. After determining the validity of the token parameter, the authentication server may feed back, to the proxy server according to a mapping relationship between the MAC address of the terminal and the authentication status, the return code corresponding to the token parameter consisting of the MAC address of the terminal and the authentication status, the mapping relationship being locally stored in the authentication server. The authentication status includes at least one of unauthenticated, temporary authentication, and permanent authentication. Therefore, the proxy server may set different firewall rules for the terminal according to the return code for the token parameter. (1) For example, if the authentication status is unauthenticated, a firewall rule set by the proxy server for the terminal is: limiting or shielding an access right of a current terminal corresponding to the MAC address of the terminal. (2) For example, if the authentication status is temporary authentication, a firewall rule set by the proxy server for the terminal is: in a specified time, enabling an access right of a current terminal corresponding to the MAC address of the terminal. (3) For example, if the authentication status is permanent authentication, a firewall rule set by the proxy server for the terminal is: when the terminal always follows an official account (for example, a WeChat official account) of a merchant, enabling, without a time limit, an access right of a current terminal corresponding to the MAC address of the terminal.

According to some embodiments of the present disclosure, because for the second request of the terminal of obtaining the WiFi login page, the authentication server actually does not return the WiFi login page to the terminal, a case in which the terminal inputs the account information including an account and a password on the login page does not exist. Specifically, the login is automatically authenticated depending on a series of interaction verifications based on the first identification parameter (for example, a temporary token parameter) and among the terminal, the proxy server, and the authentication server in the foregoing information exchange process. In the entire information processing process, the user can try/access WiFi of a merchant for free in a short time without any keyboard input. Because the WiFi login is automatically implemented by using the first identification parameter such as the temporary token parameter, after a specified time expires, if an official account of the merchant is still not followed, the temporary token parameter becomes invalid. The WiFi of the merchant can continue to be tried only when a portal (Portal) page is accessed again. The portal is a Web authentication manner. The terminal does not need to perform access with a specialized application and just needs to have a browser. Therefore, a WiFi access and networking requirement of the terminal such as a mobile phone can be conveniently implemented. In a public place, there are many WiFi hotspots. WiFi is not encrypted. However, when internet access is desired, the user needs to input WiFi-related account information such as a user name and a password, and can have access to the internet after authentication succeeds. Embodiments of the present disclosure provide improved portal authentication. The login is automatically authenticated based on interaction verification of the first identification parameter (for example, the temporary token parameter), and the user does not need to input the WiFi-related account information such as the user name and the password. The proxy server can set different firewall rules for the terminal according to a return code corresponding to the first identification parameter (for example, the temporary token parameter) received from the authentication server. The attribute of the first identification parameter is a temporary parameter. After a validity time of the first identification parameter expires, the first identification parameter becomes invalid. That is, the proxy server deletes an unrestricted access right enabled for the terminal, thereby automatically exiting the WiFi login. According to embodiments of the present disclosure, not only a WiFi login operation but also a WiFi login exiting operation becomes simple and efficient.

In an implementation of some embodiments of the present disclosure, the redirection response includes at least the Media Access Control (MAC) address of the terminal and the URL of the to-be-accessed address. Information about the MAC address and the URL of the to-be-accessed address is locked, so that the proxy server can enable, according to the information, a URL page access right for the terminal corresponding to the MAC address when the proxy server sets a firewall rule subsequently.

In an implementation of some embodiments of the present disclosure, the authentication status includes at least one of unauthenticated, temporary authentication, and permanent authentication. Based on such different authentication statuses such as the unauthenticated state, the temporary authentication state, and the permanent authentication state, the proxy server can modify the set firewall rule. For example, for the unauthenticated state, the proxy server limits or shields the URL page access right for the terminal corresponding to the MAC address. For example, for the temporary authentication state, the proxy server enables, in a specified time, the URL page access right for the terminal corresponding to the MAC address, and deletes, if the terminal still does not follow the official account of the merchant after the specified time expires, the URL page access right enabled for the terminal corresponding to the MAC address, to interrupt the WiFi login. For example, for the permanent authentication state, the proxy server permanently enables the URL page access right for the terminal corresponding to the MAC address.

In an implementation of some embodiments of the present disclosure, a mapping relationship is established between the MAC address of the terminal and the authentication status, and the mapping relationship is locally stored in the authentication server. The authentication status includes at least one of unauthenticated, temporary authentication, and permanent authentication. When the mapping relationship between the MAC address of the terminal and the authentication status is locally stored in the authentication server, whether the authentications status is unauthenticated or authentication (temporary authentication or permanent authentication) is determined according to whether the first identification parameter (for example, the temporary token parameter) used for interaction verification and submitted by the terminal is valid. For two cases of authentication (temporary authentication and permanent authentication), when the first identification parameter (for example, the temporary token parameter) is valid, the authentications status corresponding to the MAC address is updated to temporary authentication. The authentications status is updated depending on whether the terminal user follows the official account of the merchant. If the terminal user follows the official account of the merchant, the authentications status corresponding to the MAC address is updated to permanent authentication.

An embodiment of the present disclosure provides an information processing method. The method includes the following steps: A terminal is connected to WiFi, and a browser page is displayed on the terminal side. One example is: In a scenario in which a user is in a waiting hall of an airport, the user can find a WiFi hotspot for China Mobile or China Unicom or a free WiFi hotspot set for the airport. In this case, after the WiFi hotspot is selected and connected, the user terminal can be directed to a login page. However, in existing technology, the login page is to inform the user that a current connection to the WiFi hotspot is not considered as a successful WiFi login. If no account information for logging in to WiFi is entered in the login page or if entered information is not successfully verified, the user terminal cannot achieve a networking need (e.g., accessing the internet through the connected WiFi). That is, in this case, authentication of a WiFi login actually fails. Therefore, the user terminal cannot access another URL page through WiFi networking. In the existing technology, a free WiFi hotspot set for the airport is used as an example. A WiFi login can be implemented by inputting, on the login page, account information for logging in to WiFi, such as a serial number of a ticket or a phone number for purchasing a ticket, as well as a verification code. If the inputted information is successfully verified, the user terminal can access the internet service through the connected WiFi hotspot, thereby accessing another URL page. In embodiments of the present disclosure, a WiFi login can be implemented without manually inputting account information for logging in to WiFi. A first request is initiated by inputting a URL of a to-be-accessed address on the browser page. After receiving the first request, a gateway (that is, a router) routes, according to a corresponding firewall rule, the first request to a port on which a proxy server is located on the local gateway. After receiving the first request, the proxy server returns a redirection response to the terminal. For example, the proxy server provides an HTTP redirection reply, to redirect to a Web login page. A query string (QueryString) for redirection includes an ID (gwID) of the gateway, an address (gwIP) of the gateway, a port (gwPort) of the gateway, a MAC address of the gateway, and a URL of an address of a page currently accessed by the user terminal. The redirection response is used to prompt the terminal to redirect to the WiFi login page. Herein, being connected to the WiFi does not indicate that WiFi login is successful, another URL page cannot be accessed until after the terminal redirects to the WiFi login page and get authenticated. In this case, the terminal initiates a second request of obtaining the WiFi login page to an authentication server. The authentication server does not return the WiFi login page to the terminal. Therefore, the terminal user does not need to input the account information for logging in to the WiFi, to implement the WiFi login. The authentication server generates, for the second request when an identity of the terminal is not verified, a first identification parameter for the terminal, an attribute of the first identification parameter being a temporary parameter. An example of the first identification parameter is a temporary token parameter. A token refers to a (temporary) token in computer identity authentication, and is also referred to as an identifier for marking an identity authentication status. The authentication server does not return the WiFi login page to the terminal to allow the user to input a user name and a password, but directly generates a temporary token parameter without verifying the identity of the user. Therefore, subsequently, the terminal, the proxy server, and the proxy server perform a series of interactions to implement an automatic WiFi login based on the temporary token parameter.

By means of a series of interactions among the terminal, the proxy server, and the proxy server, an automatic WiFi login is implemented based on the temporary token parameter. A specific implementation includes: The proxy server receives the third request, parses out the temporary token parameter from the third request, and encapsulates the temporary token parameter into a fourth request used for authentication. The proxy server sends the fourth request to the authentication server, to request to verify validity of the temporary token parameter. That is, the proxy server needs to request to verify whether the temporary token parameter is a valid token parameter generated by the authentication server. The authentication server returns a verification result (for example, a return code corresponding to the temporary token parameter) for the temporary token parameter to the proxy server, so as to verify the validity of the temporary token parameter. The WiFi login is authenticated when the temporary token parameter is valid, so that the terminal can directly access the URL page. For ease of description, the temporary token parameter is referred to as a token parameter for short below.

Herein, for the verification result for the token parameter, the verification result is used to indicate whether the token parameter is the valid token parameter generated by the authentication server. A specific implementation is: If the token parameter has validity, the token parameter is the valid token parameter generated by the authentication server. If the token parameter has no validity, the token parameter is not the valid token parameter generated by the authentication server. After determining the validity of the token parameter, the authentication server may feed back, to the proxy server according to a mapping relationship between the MAC address of the terminal and the authentication status, the return code corresponding to the token parameter consisting of the MAC address of the terminal and the authentication status, the mapping relationship being locally stored in the authentication server. The authentication status includes at least one of unauthenticated, temporary authentication, and permanent authentication. Therefore, the proxy server may set different firewall rules for the terminal according to the return code for the token parameter. (1) For example, if the authentication status is unauthenticated, a firewall rule set by the proxy server for the terminal is: limiting or shielding an access right of a current terminal corresponding to the MAC address of the terminal. (2) For example, if the authentication status is temporary authentication, a firewall rule set by the proxy server for the terminal is: in a specified time, enabling an access right of a current terminal corresponding to the MAC address of the terminal. (3) For example, if the authentication status is permanent authentication, a firewall rule set by the proxy server for the terminal is: when the terminal always follows an official account (for example, a WeChat official account) of a merchant, enabling, without a time limit, an access right of a current terminal corresponding to the MAC address of the terminal.

Herein, that the WiFi login is authenticated when the temporary token parameter is valid, so that the terminal can directly access the URL page specifically includes: The proxy server returns the verification result (for example, the return code corresponding to the token parameter) to the terminal by using the redirection response. The redirection response is used to prompt the terminal to redirect to an authentication result page in the authentication server. If the proxy server instructs the terminal to redirect to the authentication result page in the authentication server, the terminal needs to carry the verification result returned by the authentication server, such as the return code corresponding to the token parameter or a return code referred to as a verification token. In addition, if the authentication result indicates a verification success, the proxy server sets a firewall rule for the gateway, so that all requests of a current user do not need to be redirected to the proxy server, but are directly sent to the authentication server. The terminal initiates a fifth request used for authentication to the authentication server by carrying the verification result, for example, initiating a request of verifying the result page. After receiving the request, the authentication server displays, according to the verification result, whether the current terminal is authenticated or is not authenticated. If the authentication succeeds, the terminal can directly access an Internet service without the proxy server. If the authentication server determines, according to the verification result, that the token parameter is valid, the verification succeeds. When the token parameter is valid, the proxy server sets the firewall rule to enabling an unrestricted access right for the terminal, so that all the requests of the current terminal user do not need to be redirected to the proxy server, and the terminal can directly access the URL page according to the firewall rule. Correspondingly, the authentication server updates an authentication type (e.g., authentication status) corresponding to the MAC address to temporary authentication. If the proxy server detects that the terminal user still does not follow the official account after the specified time expires, the token parameter becomes invalid. That is, the token parameter currently has no validity. When the token parameter is invalid, the proxy server deletes, in the firewall rule, the unrestricted access right enabled for the terminal.

According to some embodiments of the present disclosure, because the authentication server does not return the WiFi login page to the terminal in response to receiving the second request of the terminal of obtaining the WiFi login page, a case in which the terminal inputs the account information including an account and a password on the login page does not exist, i.e., the terminal does not need to input account information. Specifically, the login is automatically authenticated depending on a series of interaction verifications based on the first identification parameter (for example, a temporary token parameter) and among the terminal, the proxy server, and the authentication server in the foregoing information exchange process. In the entire information processing process, the user can try WiFi of a merchant for free in a short time without any keyboard input. Because the WiFi login is automatically implemented by using the first identification parameter such as the temporary token parameter, after a specified time expires, if an official account of the merchant is still not followed, the temporary token parameter becomes invalid. The WiFi of the merchant can continue to be tried only when a portal (Portal) page is accessed again. The portal is a Web authentication manner. The terminal does not need to perform access with a specialized application and just needs to have a browser. Therefore, a WiFi access and networking requirement of the terminal such as a mobile phone can be conveniently implemented. In a public place, there are many WiFi hotspots. WiFi is not encrypted. However, when a user would like to access a network, the user needs to input WiFi-related account information such as a user name and a password, and can have access to a network after authentication succeeds. Embodiments of the present disclosure provide improved portal authentication. The login is automatically authenticated based on interaction verification of the first identification parameter (for example, the temporary token parameter), and the user does not need to input the WiFi-related account information such as the user name and the password. The proxy server can set different firewall rules for the terminal according to a return code corresponding to the first identification parameter (for example, the temporary token parameter) received from the authentication server. The attribute of the first identification parameter is a temporary parameter. After a validity time of the first identification parameter expires, the first identification parameter becomes invalid. That is, the proxy server deletes an unrestricted access right enabled for the terminal, thereby automatically exiting the WiFi login. According to embodiments of the present disclosure, not only a WiFi login operation but also a WiFi login exiting operation becomes simple and efficient.

In an implementation of some embodiments of the present disclosure, the redirection response includes at least the Media Access Control (MAC) address of the terminal and the URL of the to-be-accessed address. Information about the MAC address and the URL of the to-be-accessed address is locked, so that the proxy server can enable, according to the information, a URL page access right for the terminal corresponding to the MAC address when the proxy server sets a firewall rule subsequently.

In an implementation of some embodiments of the present disclosure, the authentication status includes at least one of unauthenticated, temporary authentication, and permanent authentication. Based on such different authentication statuses such as the unauthenticated state, the temporary authentication state, and the permanent authentication state, the proxy server can modify the set firewall rule. For example, for the unauthenticated state, the proxy server limits or shields the URL page access right for the terminal corresponding to the MAC address. For example, for the temporary authentication state, the proxy server enables, in a specified time, the URL page access right for the terminal corresponding to the MAC address, and deletes, if the terminal still does not follow the official account of the merchant after the specified time expires, the URL page access right enabled for the terminal corresponding to the MAC address, to interrupt the WiFi login. For example, for the permanent authentication state, the proxy server permanently enables the URL page access right for the terminal corresponding to the MAC address.

In an implementation of some embodiments of the present disclosure, a mapping relationship is established between the MAC address of the terminal and the authentication status, and the mapping relationship is locally stored in the authentication server. The authentication status includes at least one of unauthenticated, temporary authentication, and permanent authentication. When the mapping relationship between the MAC address of the terminal and the authentication status is locally stored in the authentication server, whether the authentications status is unauthenticated or authentication (temporary authentication or permanent authentication) is determined according to whether the first identification parameter (for example, the temporary token parameter) used for interaction verification and submitted by the terminal is valid. For two cases of authentication (temporary authentication and permanent authentication), when the first identification parameter (for example, the temporary token parameter) is valid, the authentications status corresponding to the MAC address is updated to temporary authentication. The authentications status is updated depending on whether the terminal user follows the official account of the merchant. If the terminal user follows the official account of the merchant, the authentications status corresponding to the MAC address is updated to permanent authentication.

An embodiment of the present disclosure provides an information processing method. With reference to the descriptions related to the temporary authentication in the foregoing embodiments, after the WiFi login is authenticated, the temporary authentication is updated to the permanent authentication by following the official account of the merchant on the terminal, so that the terminal can always maintain a WiFi login without inputting account information, and WiFi is not disconnected suddenly. A specific implementation includes the following content:

An embodiment of the present disclosure provides an information processing method. The method includes the following steps: A terminal is connected to WiFi, and a browser page is displayed on the terminal side. One example is: In a scenario in which a user is in a waiting hall of an airport, the user can find a WiFi hotspot for China Mobile or China Unicom or a free WiFi hotspot set for the airport. In this case, after the WiFi hotspot is selected and connected, the user terminal can be directed to a login page. However, in existing technology, the login page is to inform the user that a current connection to the WiFi hotspot is not considered as a successful WiFi login. If no account information for logging in to WiFi is entered in the login page or if entered information is not successfully verified, the user terminal cannot achieve a networking need (e.g., accessing the internet through the connected WiFi). That is, in this case, authentication of a WiFi login actually fails. Therefore, the user terminal cannot access another URL page through WiFi networking. In the existing technology, a free WiFi hotspot set for the airport is used as an example. A WiFi login can be implemented by inputting, on the login page, account information for logging in to WiFi, such as a serial number of a ticket or a phone number for purchasing a ticket, as well as a verification code. If the inputted information is successfully verified, the user terminal can access the internet service through the connected WiFi hotspot, thereby accessing another URL page. In embodiments of the present disclosure, a WiFi login can be implemented without manually inputting account information for logging in to WiFi. A first request is initiated by inputting a URL of a to-be-accessed address on the browser page. After receiving the first request, a gateway (that is, a router) routes, according to a corresponding firewall rule, the first request to a port on which a proxy server is located on the local gateway. After receiving the first request, the proxy server returns a redirection response to the terminal. For example, the proxy server provides an HTTP redirection reply, to redirect to a Web login page. A query string (QueryString) for redirection includes an ID (gwID) of the gateway, an address (gwIP) of the gateway, a port (gwPort) of the gateway, a MAC address of the gateway, and a URL of an address of a page currently accessed by the user terminal. The redirection response is used to prompt the terminal to redirect to the WiFi login page to be authenticated before accessing the URL page. Herein, a current connection to the WiFi hotspot is not considered as a successful WiFi login. The terminal needs to redirect to the WiFi login page for authentication before gaining access to internet service through the WiFi hotspot. In this case, the terminal initiates a second request of obtaining the WiFi login page to an authentication server. The authentication server does not return the WiFi login page to the terminal. Therefore, the terminal user does not need to input the account information for logging in to the WiFi, to implement the WiFi login. The authentication server generates, for the second request when an identity of the terminal is not verified, a first identification parameter for the terminal, an attribute of the first identification parameter being a temporary parameter. An example of the first identification parameter is a temporary token parameter. A token refers to a (temporary) token in computer identity authentication, and is also referred to as an identifier for marking an identity authentication status. The authentication server does not return the WiFi login page to the terminal to request the user to input a user name and a password, but directly generates a temporary token parameter without verifying the identity of the user. Therefore, subsequently, the terminal, the proxy server, and the proxy server perform a series of interactions to implement an automatic WiFi login based on the temporary token parameter.

By means of a series of interactions among the terminal, the proxy server, and the proxy server, an automatic WiFi login is implemented based on the temporary token parameter. A specific implementation includes: The proxy server receives the third request, parses out the temporary token parameter from the third request, and encapsulates the temporary token parameter into a fourth request used for authentication. The proxy server sends the fourth request to the authentication server, to request to verify validity of the temporary token parameter. That is, the proxy server needs to request to verify whether the temporary token parameter is a valid token parameter generated by the authentication server. The authentication server returns a verification result (for example, a return code corresponding to the temporary token parameter) for the temporary token parameter to the proxy server, so as to verify the validity of the temporary token parameter. The WiFi login is authenticated when the temporary token parameter is valid, so that the terminal can directly access the URL page. For ease of description, the temporary token parameter is referred to as a token parameter for short below.

Herein, for the verification result for the token parameter, the verification result is used to indicate whether the token parameter is the valid token parameter generated by the authentication server. A specific implementation is: If the token parameter has validity, the token parameter is the valid token parameter generated by the authentication server. If the token parameter has no validity, the token parameter is not the valid token parameter generated by the authentication server. After determining the validity of the token parameter, the authentication server may feed back, to the proxy server according to a mapping relationship between the MAC address of the terminal and the authentication status, the return code corresponding to the token parameter consisting of the MAC address of the terminal and the authentication status, the mapping relationship being locally stored in the authentication server. The authentication status includes at least one of unauthenticated, temporary authentication, and permanent authentication. Therefore, the proxy server may set different firewall rules for the terminal according to the return code for the token parameter. (1) For example, if the authentication status is unauthenticated, a firewall rule set by the proxy server for the terminal is: limiting or shielding an access right of a current terminal corresponding to the MAC address of the terminal. (2) For example, if the authentication status is temporary authentication, a firewall rule set by the proxy server for the terminal is: in a specified time, enabling an access right of a current terminal corresponding to the MAC address of the terminal. (3) For example, if the authentication status is permanent authentication, a firewall rule set by the proxy server for the terminal is: when the terminal always follows an official account (for example, a WeChat official account) of a merchant, enabling, without a time limit, an access right of a current terminal corresponding to the MAC address of the terminal.

Herein, for the official account of the merchant needing to be followed after the WiFi login is authenticated, after the WiFi login is authenticated, a terminal application generates a subscribing event by following the official account, generates a subscribing request according to the subscribing event, and sends the subscribing request to the authentication server. The authentication server generates media information and link information, and forwards the media information and the link information to the terminal by using an application platform (for example, a WeChat server). The terminal triggers a specified operation for the link information according to the media information, to complete the authentication based on following the official account. After the authentication based on following the official account is completed, the authentication server obtains a terminal user identifier (for example, OpenID) obtained by following the official account, and queries the MAC address of the corresponding terminal according to the terminal user identifier (for example, OpenID). The authentication server updates an authentication type corresponding to the MAC address to permanent authentication. Specifically, the authentication server updates the authentication type corresponding to the MAC address to permanent authentication by using the MAC address, the gateway ID in QueryString requested by the user terminal and the OpenID information obtained by following the official account by the user. The authentication server returns, to the user terminal, a page indicating a permanent authentication success, thereby implementing permanent authentication for the user terminal to log in to the WiFi.

The OpenID is a user-orientated digital identity identifying framework. Creation of the OpenID is similar to that a unique identity of a website is authenticated by using a URL. Likewise, the user may create an OpenID in this manner for user identity authentication. Because the URL is a core of the entire network world, the URL provides a wide and solid foundation for URL-based user identity authentication. A first function of the OpenID is identity verification, that is, authenticating a user identity by using the URL. Login authentication is implemented based on a user name and a password on all current websites. This means that a user needs to register a user name and a password on each website, even though the user uses a same password. Operations are burdensome. However, if the user uses the OpenID, a website address (for example, the URL) of the user is the user name of the user, and the password is securely stored on an OpenID service network. In this way, operations become simple. For the OpenID service network, the user may establish an OpenID service network or may select a trustable OpenID service network to complete registration, so that user identity verification is completed by using the OpenID. The OpenID corresponding to the user identity is an identifier uniquely corresponding to the user identity on the website or in an application.

In an implementation of some embodiments of the present disclosure, After the foregoing permanent authentication procedure is completed by following the official account, the method may further include: When querying validity of the token parameter, the proxy server returns an authentication status indicating permanent validity. Therefore, the proxy server does not delete the firewall rule corresponding to the MAC address of the user terminal. In this way, after this WiFi connection, all requests do not need to pass through the proxy server. When the user terminal connects to the WiFi of the merchant next time, because the previous firewall rule may be already deleted, to avoid excessive firewall rules of the gateway, the proxy server may check an active status of user terminals, and regularly deletes a firewall rule corresponding to an inactive MAC address. Therefore, a temporary authentication procedure may need to be performed again. However, when the terminal requests the WiFi login page from the authentication server, the authentication server does not return the WiFi login page, but returns the token parameter. It should be noted that the token parameter is a token parameter for permanent authentication, and is not a token parameter for temporary authentication. Therefore, the user terminal can complete the entire authentication only by performing 302 jump for two times, and the user does not need to perform any other operation in this process. Compared with the pure temporary authentication procedure, steps of the entire procedure are simplified.

In an implementation of some embodiments of the present disclosure, After the user follows the official account to implement the permanent authentication, the user may unfollow the official account. When the user unfollows the official account, a processing procedure includes: The user enters a detailed page of the official account of the merchant in a social networking service (SNS) application such as a WeChat application, and taps unfollowing. An application platform such as a WeChat server pushes a message of the unfollowing to the authentication server. The authentication server queries an ID of a gateway device of the merchant and an OpenID of the user obtained by using the pushed message, and deletes corresponding authentication information from the background, for example, the authentication status corresponding to the MAC address is permanent authentication. After unfollowing is performed, because the authentication information has been deleted, the user terminal needs to perform the previous temporary authentication procedure when the user terminal connects to the WiFi of the merchant next time.

According to embodiments of the present disclosure, for the temporary authentication, the following can be implemented: Even though the user does not follow the official account of the merchant, the user can still try the WiFi of the merchant for free, but regular access interruptions caused by temporary re-authentication may occur. Certainly, because the temporary authentication does not require intervention from the user, the impact on the user is very small. For the permanent authentication in embodiments of the present disclosure, the following can be implemented: After the user follows the official account of the merchant, the user terminal can implement unrestricted WiFi access whenever the user terminal is connected to the WiFi of the merchant, and is not interfered by the authentication procedure. Therefore, the entire solution consisting of the temporary authentication and the permanent authentication can implement balance between the merchant and the user relatively perfectly. In this way, the user can obtain good WiFi use experience, and the number of followers of the merchant can be increased. In addition, an association is established between the WiFi login and following the official account of the merchant, thereby facilitating information sharing and broadcasting.

Figure 7:
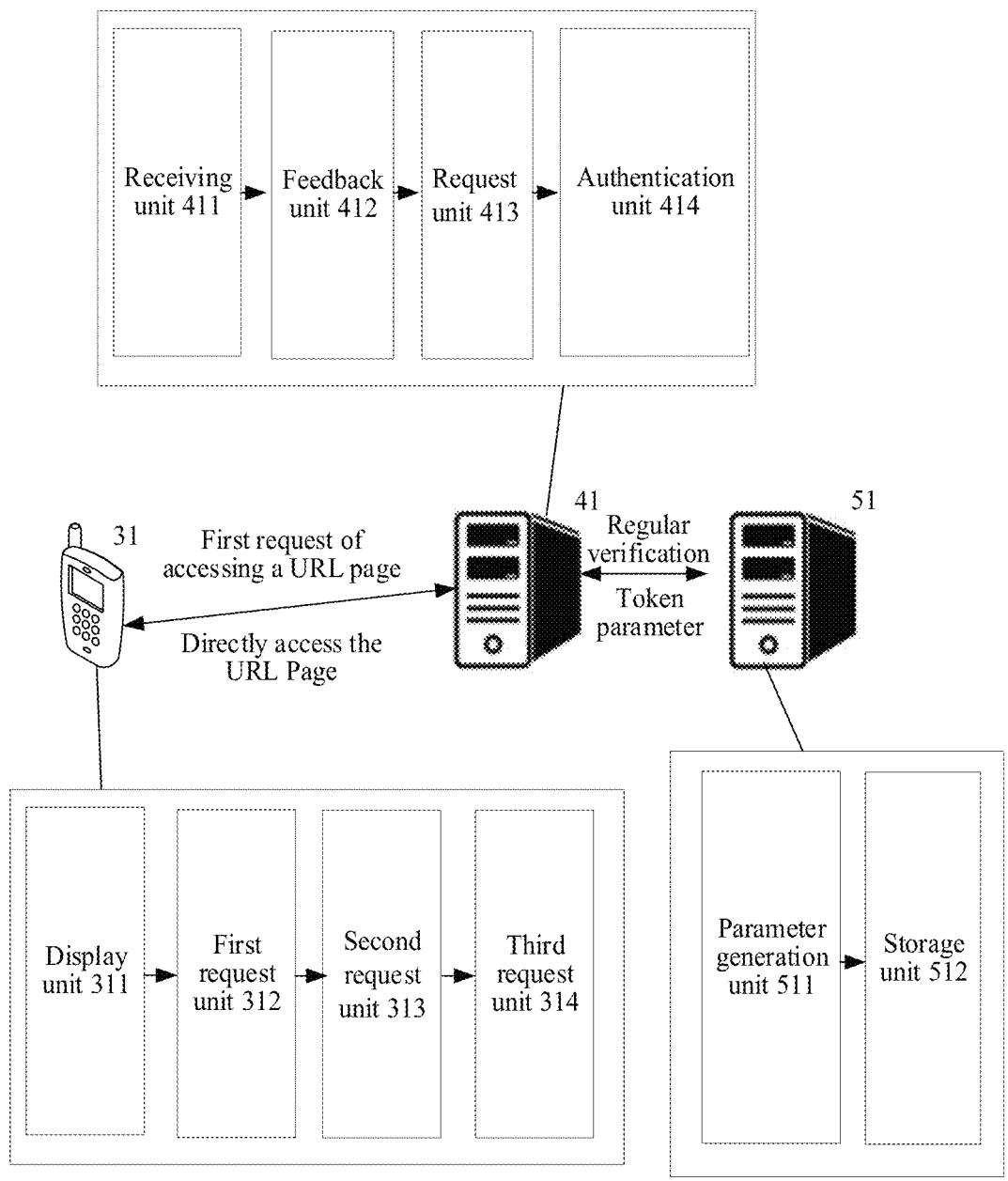
FIG. 7 is a schematic composition diagram of a system according to an embodiment of the present disclosure.

An embodiment of the present disclosure provides an information processing system. As shown in FIG. 7, the system includes a terminal 31, a proxy server 41, and an authentication server 51. The terminal 31 includes: a display unit 311, configured to display a browser page on a terminal side when a terminal is connected to WiFi; a first request unit 312, configured to initiate a first request by inputting a URL of a to-be-accessed address on the browser page; a second request unit 313, configured to initiate a second request of obtaining a WiFi login page to the authentication server; and a third request unit 314, configured to initiate a third request used for authentication to the proxy server according to a first identification parameter (for example, a token parameter). The proxy server 41 includes: a receiving unit 411, configured to receive a first request, the first request being triggered by inputting, after the terminal is connected to the WiFi, the URL of the to-be-accessed address on the browser page displayed on the side of the terminal; a feedback unit 412, configured to return a redirection response to the terminal, the redirection response being used for prompting the terminal to redirect to a WiFi login page to be authenticated before accessing a URL page; a request unit 413, configured to use the first identification parameter (for example, the token parameter) to verify validity of the first identification parameter (for example, the token parameter), the first identification parameter (for example, the token parameter) being a first identification parameter (for example, the token parameter) generated for the terminal without verifying an identity of the terminal user and for the second request of obtaining the WiFi login page initiated by the authentication server, and an attribute of the first identification parameter (for example, the token parameter) being a temporary parameter; and an authentication unit 414, configured to authenticate the WiFi login when the first identification parameter (for example, the token parameter) is valid, so that the terminal can directly access the URL page. The authentication server 51 includes: a parameter generation unit 511, configured to generate the first identification parameter (for example, the token parameter) for the terminal for the second request without verifying an identity of the terminal user, the attribute of the first identification parameter (for example, the token parameter) being a temporary parameter; and a storage unit 512, configured to: establish a mapping relationship between a MAC address of the terminal and an authentication status, and locally store the mapping relationship.

Based on the foregoing information processing system shown in FIG. 7, after a terminal is connected to WiFi, a browser page is displayed on the terminal side. One example is: In a scenario in which a user is in a waiting hall of an airport, the user can find a WiFi hotspot for China Mobile or China Unicom or a free WiFi hotspot set for the airport. In this case, after the WiFi hotspot is selected and connected, the user terminal can be directed to a login page. However, in existing technology, the login page is to inform the user that a current connection to the WiFi hotspot is not considered as a successful WiFi login. If no account information for logging in to WiFi is entered in the login page or if entered information is not successfully verified, the user terminal cannot achieve a networking need (e.g., accessing the internet through the connected WiFi). That is, in this case, authentication of a WiFi login actually fails. Therefore, the user terminal cannot access another URL page through WiFi networking. In the existing technology, a free WiFi hotspot set for the airport is used as an example. A WiFi login can be implemented by inputting, on the login page, account information for logging in to WiFi, such as a serial number of a ticket or a phone number for purchasing a ticket, as well as a verification code. If the inputted information is successfully verified, the user terminal can access the internet service through the connected WiFi hotspot, thereby accessing another URL page. In embodiments of the present disclosure, a WiFi login can be implemented without manually inputting the account information for logging in to WiFi. A first request is initiated by inputting a URL of a to-be-accessed address on the browser page. After receiving the first request, the proxy server returns a redirection response to the terminal, the redirection response is used for prompting the terminal to redirect to a WiFi login page to be authenticated before accessing a URL page. Herein, a current connection to the WiFi hotspot is not considered as a successful WiFi login. The terminal needs to redirect to the WiFi login page for authentication before gaining access to internet service through the WiFi hotspot. In this case, the terminal initiates a second request of obtaining the WiFi login page to an authentication server. The authentication server does not return the WiFi login page to the terminal.

Therefore, the terminal user does not need to input the account information for logging in to the WiFi, to implement the WiFi login. The authentication server generates, for the second request when an identity of the terminal user is not verified, a first identification parameter for the terminal user, an attribute of the first identification parameter being a temporary parameter. An example of the first identification parameter is a temporary token parameter. A token refers to a (temporary) token in computer identity authentication, and is also referred to as an identifier for marking an identity authentication status. The authentication server does not return the WiFi login page to the terminal to request the user to input a user name and a password, but directly generates a temporary token parameter without verifying the identity of the user. Therefore, subsequently, the terminal, the proxy server, and the proxy server perform a series of interactions to implement an automatic WiFi login based on the temporary token parameter. Specifically, the terminal initiates a third request used for authentication to the proxy server according to the first identification parameter. The proxy server regularly requests, by using the first identification parameter, the authentication server to verify the validity of the first identification parameter. When the first identification parameter is valid, the WiFi login is authenticated, so that the terminal can directly access the URL page.

According to some embodiments of the present disclosure, because for the second request of the terminal of obtaining the WiFi login page, the authentication server actually does not return the WiFi login page to the terminal, a case in which the terminal inputs the account information including an account and a password on the login page does not exist. Specifically, the login is automatically authenticated depending on a series of interaction verifications based on the first identification parameter (for example, a temporary token parameter) and among the terminal, the proxy server, and the authentication server in the foregoing information exchange process. In the entire information processing process, the user can try WiFi of a merchant for free in a short time without any keyboard input. Because the WiFi login is automatically implemented by using the first identification parameter such as the temporary token parameter, after a specified time expires, if an official account of the merchant is still not followed, the temporary token parameter becomes invalid. The WiFi of the merchant can continue to be tried only when a portal (Portal) page is accessed again. The portal is a Web authentication manner. The terminal does not need to perform access with a specialized application and just needs to have a browser. Therefore, a WiFi access and networking requirement of the terminal such as a mobile phone can be conveniently implemented. In a public place, there are many WiFi hotspots. WiFi is not encrypted. However, when a user is to access a network, the user needs to input WiFi-related account information such as a user name and a password, and can have access to a network after authentication succeeds. Embodiments of the present disclosure provide improved portal authentication. The login is automatically authenticated based on interaction verification of the first identification parameter (for example, the temporary token parameter), and the user does not need to input the WiFi-related account information such as the user name and the password. The attribute of the first identification parameter is a temporary parameter. After a validity time of the first identification parameter expires, the first identification parameter becomes invalid, and the WiFi login is automatically exited. According to embodiments of the present disclosure, not only a WiFi login operation but also a WiFi login exiting operation becomes simple and efficient. In addition, a temporary authentication status or a permanent authentication status can be simply switched depending on an operation of the user, thereby greatly improving the efficiency of the authentication process.

In an implementation of some embodiments of the present disclosure, the redirection response includes at least the Media Access Control (MAC) address of the terminal and the URL of the to-be-accessed address. Information about the MAC address and the URL of the to-be-accessed address is locked, so that the proxy server can enable, according to the information, a URL page access right for the terminal corresponding to the MAC address when the proxy server sets a firewall rule subsequently.

In an implementation of some embodiments of the present disclosure, the authentication status includes at least one of unauthenticated, temporary authentication, and permanent authentication. Based on such different authentication statuses such as the unauthenticated state, the temporary authentication state, and the permanent authentication state, the proxy server can modify the set firewall rule. For example, for the unauthenticated state, the proxy server limits or shields the URL page access right for the terminal corresponding to the MAC address. For example, for the temporary authentication state, the proxy server enables, in a specified time, the URL page access right for the terminal corresponding to the MAC address, and deletes, if the terminal still does not follow the official account of the merchant after the specified time expires, the URL page access right enabled for the terminal corresponding to the MAC address, to interrupt the WiFi login. For example, for the permanent authentication state, the proxy server permanently enables the URL page access right for the terminal corresponding to the MAC address.

In an implementation of some embodiments of the present disclosure, a mapping relationship is established between the MAC address of the terminal and the authentication status, and the mapping relationship is locally stored in the authentication server. The authentication status includes at least one of unauthenticated, temporary authentication, and permanent authentication. When the mapping relationship between the MAC address of the terminal and the authentication status is locally stored in the authentication server, whether the authentications status is unauthenticated or authentication (temporary authentication or permanent authentication) is determined according to whether the first identification parameter (for example, the temporary token parameter) used for interaction verification and submitted by the terminal user is valid. For two cases of authentication (temporary authentication and permanent authentication), when the first identification parameter (for example, the temporary token parameter) is valid, the authentications status corresponding to the MAC address is updated to temporary authentication. The authentications status is updated depending on whether the terminal user follows the official account of the merchant. If the terminal user follows the official account of the merchant, the authentications status corresponding to the MAC address is updated to permanent authentication.

In an implementation of some embodiments of the present disclosure, the request unit in the proxy server is further configured to: receive the third request, the third request being a third request used for authentication and initiated by the terminal to the proxy server according to the first identification parameter; parse out the first identification parameter from the third request; encapsulate the first identification parameter into a fourth request; send the fourth request to the first identification parameter, to request to verify the validity of the first identification parameter; and receive the verification result returned by the authentication server for the first identification parameter.

In an implementation of some embodiments of the present disclosure, the authentication unit in the proxy server is further configured to: set a firewall rule when the first identification parameter is valid, to enable an unrestricted access right for the terminal, so that the terminal can directly access the URL page according to the firewall rule.

In an implementation of some embodiments of the present disclosure, the request unit in the proxy server is further configured to: if it is detected that the official account is still not followed after the specified time expires, invalidate the first identification parameter; and delete the unrestricted access right enabled for the terminal in the firewall when the first identification parameter is invalid.

In an implementation of some embodiments of the present disclosure, the feedback unit in the proxy server is configured to return the verification result to the terminal by using the redirection response, the redirection response being used to prompt the terminal to redirect to an authentication result page in the authentication server. Correspondingly, the terminal further includes a fifth request unit, configured to initiate a fifth request used for authentication to the authentication server by carrying the verification result. The authentication server further includes a verification unit, configured to determine, according to the verification result, that the first identification parameter is valid, the verification succeeding. The authentication unit in the proxy server is configured to set the firewall rule when the first identification parameter is valid, to enable the unrestricted access right for the terminal, so that the terminal can directly access the URL page according to the firewall rule.

In an implementation of some embodiments of the present disclosure, the authentication server further includes an update unit, configured to update the authentication type corresponding to the MAC address to temporary authentication.

In an implementation of some embodiments of the present disclosure, the request unit in the proxy server is further configured to: if it is detected that the official account is still not followed after the specified time expires, invalidate the first identification parameter; and delete the unrestricted access right enabled for the terminal in the firewall when the first identification parameter is invalid.

In an implementation of some embodiments of the present disclosure, the terminal further includes: a following unit, configured to generate a subscribing event by following the official account after the WiFi login is authenticated; and a subscribing request sending unit, configured to: generate a subscribing request according to the subscribing event, and send the subscribing request to the authentication server. Correspondingly, the authentication server further includes an information generation unit, configured to: generate media information and link information, and forward the media information and the link information to the terminal by using an application platform, so that the terminal triggers a specified operation for the link information according to the media information, to complete authentication based on following the official account.

In an implementation of some embodiments of the present disclosure, the update unit in the authentication server is further configured to: after completing the authentication based on following the official account, obtain a terminal user identifier obtained by following the official account; and query the MAC address of the corresponding terminal according to the terminal user identifier; and update the authentication type corresponding to the MAC address to permanent authentication.

During processing, a processor for data processing may be implemented by using a microprocessor, a central processing unit (CPU), a digital signal processor (DSP), or a field programmable gate array (FPGA). A storage medium includes an operation instruction. The operation instruction may be computer executable code, and the steps of the processes of the information processing methods in the embodiments of the present disclosure are performed by using the operation instruction.

It should be noted that the description about the terminal and the server is similar to that about the method, and beneficial effects are similar. Details are not described again. For technical details not disclosed in the terminal and server embodiments of the present disclosure, refer to the description of the embodiments of the method procedure of the present disclosure.

The embodiments of the present disclosure are described as follows by using an example of a real application scenario:

This application scenario is an official account information promoting scenario combining an official account with a WiFi login. According to an embodiment of the present disclosure, an official account promotion solution based on portal authentication is specifically provided.

For this application scenario, in the prior art, because an increasing number of merchants have their own WeChat official accounts currently, the merchants can provide better services for followers. In addition, these merchants usually provide free WiFi services in their own premises, so that when entering the premises, customers can access a wireless network at any time and enjoy various Internet services. Then, whether the WiFi login can be implemented by following an official account of a merchant by combining the WiFi login with the official account? If the WiFi login can be implemented, the number of followers of the official account of the merchant can be increased, and information exchange between the merchant and the follower can be facilitated. In addition, the user terminal can conveniently access a wireless network in the premises of the merchant at any time. This is a win-win for both the merchant and the follower. Currently, the merchant displays account information for the WiFi login at a relatively distinctive position in the premises, for example, on a menu or on a wall in the shop. Disadvantages of this solution are: (1) A user can directly use the account information found in the shop to log in to WiFi, without following a WeChat official account. (2) The user needs to manually connect to the WiFi of the merchant and input the found account information. This is relatively complex for input devices such as a mobile phone, and the user easily inputs wrong account information.

Figure 2:
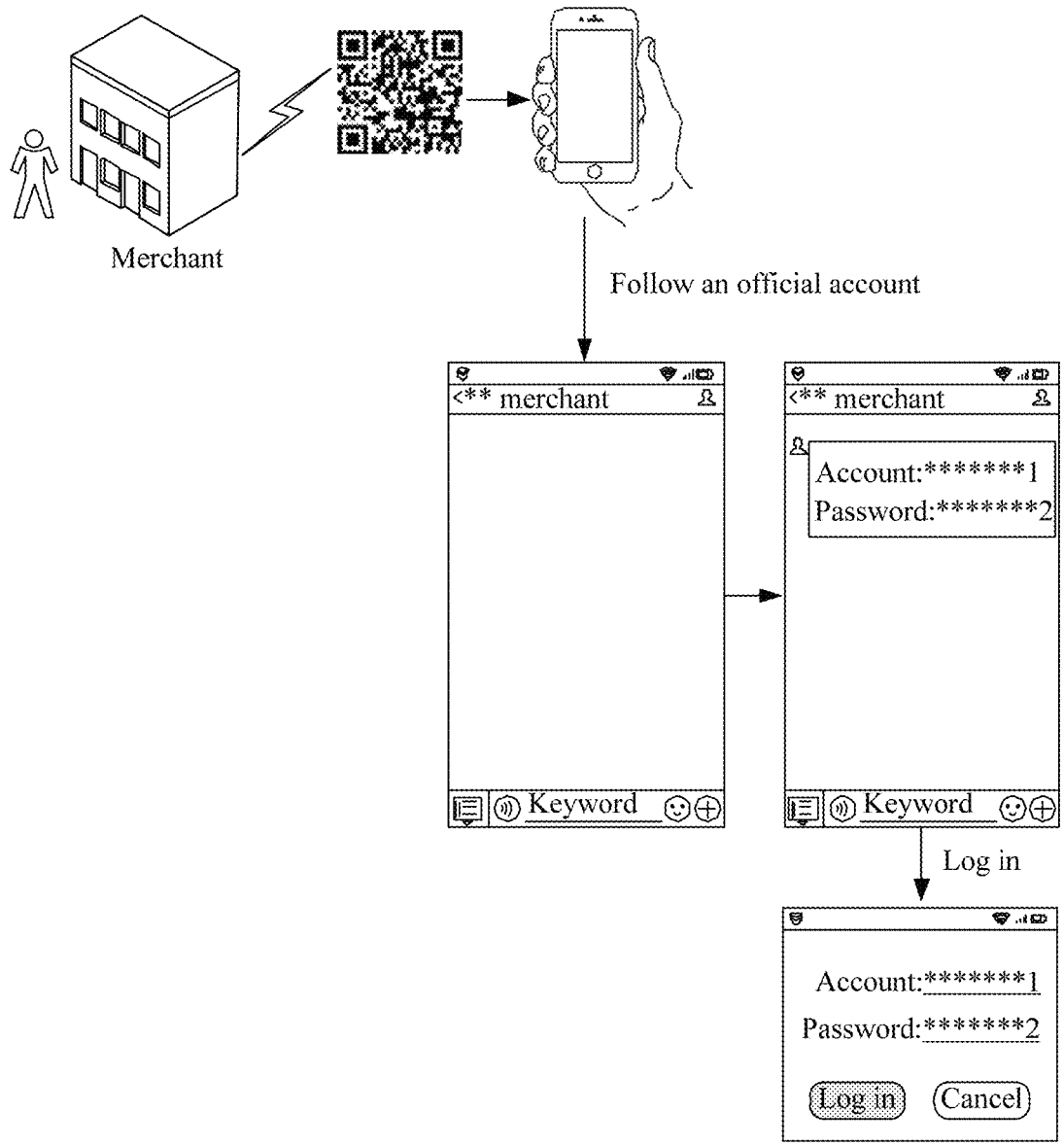

To resolve the problem, the merchant can provide a QR code of the official account of the merchant with reference to the official account. A customer follows the official account of the merchant, obtains a login account and a password by inputting a keyword or by means of a menu, and then copies and pastes the account and the password to the portal login page, to connect to the WiFi of the merchant, as shown in FIG. 1-2. This method is improved compared with the previous method. The official account can be followed, and the user just needs to perform copying and pasting and does not need to manually input login information on the login page. Certainly, this method also has disadvantages: (1) Because the merchant modifies a login account of a wireless router, all followers need to obtain the login account again, and repeat a login procedure. This is burdensome for users. (2) If the merchant does not modify the WiFi login account for a long time, the login account may be used by the users following the official account. In this case, there is no sense in following the official account of the merchant.

Figure 3:
FIG. 3 is a schematic diagram of implementing a WiFi login by following an official account of a merchant in the existing technology.

Another solution in combination with the official account is a function of connecting WeChat to WiFi. As shown in FIG. 3, WeChat serves as a plugin of a public platform and is open for massive official accounts. In this solution, when the user selects a WiFi access point (AP) of the merchant, an authentication portal page generated by using a WeChat template is popped up. Then, a WeChat client is awoken by tapping a function of "directly connecting to WiFi after WeChat is enabled" on the page. The user taps the function and connects to the WiFi. An operator Server (namely, AuthServer) determines whether the current user is allowed, and if the user is allowed, sets a corresponding AP white list policy, and returns a response indicating that the WeChat client allows a connection. Finally, the WeChat client prompts a successful connection to the user, so that the user can freely access the WiFi. On a page indicating a login success, WeChat provides a multi-select function for following. The function is selected by default, and when the user taps a completion button, the official account of the merchant is automatically followed. Otherwise, a response indicating a verification failure is returned. The WeChat client prompts a connection failure to the user. Because the user does not need to perform any keyboard input in the entire procedure, this solution provides more convenience to the user compared with the first method. However, this method also has disadvantages: (1) Following the official account is not a necessary procedure, and the user can cancel the following function on the page indicating the login success. (2) The entire login process depends on the WeChat client. If the user does not install WeChat, the entire procedure cannot be performed.

For the foregoing application, embodiments of the present disclosure can implement the following: (1) The user can try the WiFi of the merchant for a short time for free without any keyboard input, and needs to access the portal page again after the specified time expires. (2) If the user follows the official account when the user terminal tries the WiFi of the merchant, the user terminal does not need to access the portal page when the user terminal is to connect to the WiFi of the merchant subsequently, and WiFi use experience of the user is not interrupted. (3) If the user unfollows the official account of the merchant, the user terminal still needs to connect to the WiFi of the merchant by using the portal page, to access the Internet.

Figure 8:
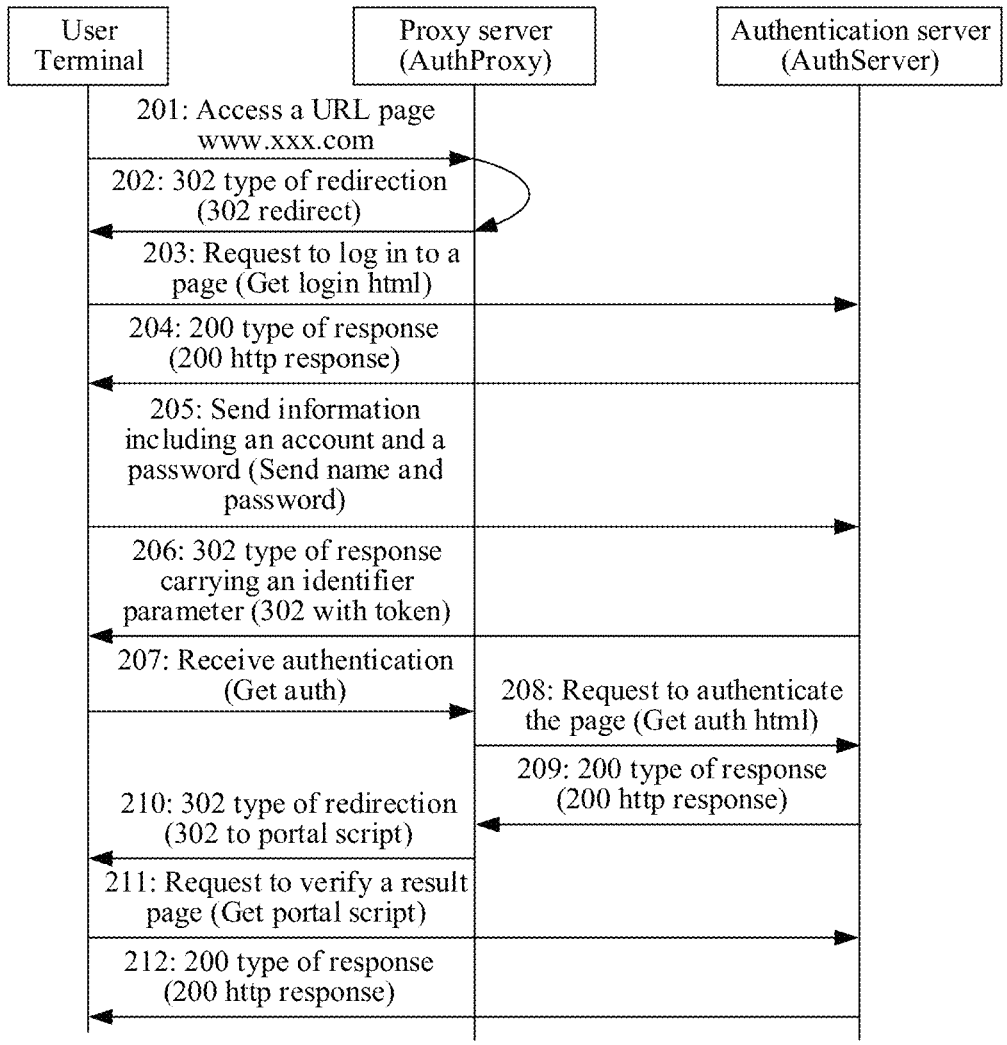
FIG. 8 is a schematic flowchart of portal-based authentication according to an embodiment of the present disclosure.

According to embodiments of the present disclosure in this application scenario, specific technical solutions include the following content:

First, an implementation technology based on portal authentication in some embodiments of the present disclosure is described. As shown in FIG. 8, FIG. 8 shows an implementation solution based on portal authentication, and displays a basic procedure of completing portal authentication after the user terminal is connected to the WiFi. The following steps are included:

Step 201: After connecting to WiFi, a user terminal initiates an HTTP request for a page www.xxx.com by using a browser, for example, inputting address information www.xxx.com of a to-be-accessed URL page in the browser.

Step 202: 302 type of redirection (302 redirect).

Herein, after receiving the HTTP request, a gateway (that is, a router) routes, according to a corresponding firewall rule, the HTTP request to a port on which AuthProxy is located on the local gateway. AuthProxy provides an HTTP redirection reply, so as to redirect to a Web login page. QueryString for redirection includes an ID (gwID) of the gateway, an address (gwIP) of the gateway, a port (gwPort) of the gateway, a MAC address of the user terminal, and a URL of an address of a page currently accessed by the user terminal.

Step 203: Request to log in to a page (Get login html).

Herein, after the user terminal receives the 302 response, the user terminal requests a login page from AuthServer.

Step 204: 200 type of response (200 http response).

Herein, AuthServer returns the login page to the user terminal.

Step 205: Send information including an account and a password (Send name and passwd).

Herein, after receiving the login page, the user fills in information including a user name and a password, and sends an authentication request to AuthServer, the authentication request carrying a parameter in QueryString returned by AuthProxy.

Step 206: 302 type of response carrying an identifier parameter (302 with token).

Herein, after AuthServer verifies the user name and the password filled by the user, if the verification succeeds, a temporary token used for authentication is generated, and the user terminal redirects to AuthProxy.

Step 207: Receive authentication (Get auth).

Herein, after receiving an authentication result of AuthServer, the user terminal sends/redirects the generated token to AuthProxy.

Step 208: Request to authenticate the page (Get auth html).

Herein, AuthProxy receives a temporary authentication result of the user terminal, obtains the token parameter, and initiates an authentication request to AuthServer, to verify whether the token is a valid token generated by AuthServer.

Step 209: 200 type of response (200 http response).

Herein, AuthServer verifies validity of the token, and returns a result to AuthProxy.

Step 210: 302 type of redirection (302 to portal script).

Herein, AuthProxy instructs the user terminal to redirect to an authentication result page of AuthServer by carrying a return code of verifying the token by AuthServer. In addition, if the authentication result indicates a verification success, AuthProxy sets a firewall rule of the gateway, so that all requests of the current user do not need to be redirected to AuthProxy.

Step 211: Request to verify a result page (Get portal script).

Herein, the user terminal initiates a request to the verification result page.

Step 212: 200 type of response (200 http response).

Herein, AuthServer displays, according to the verification result, whether the current user is authenticated or is not authenticated. If the user is authenticated, the user can directly access an Internet service without using AuthProxy.

For the foregoing implementation based on portal authentication, (1) In an initial case, the gateway configures the firewall rule, so that all HTTP requests need to be routed to AuthProxy of the gateway, that is, a request of any user terminal connected to the gateway is to be processed by AuthProxy. However, there is an exception. That is, for a request of AuthServer, a firewall rule is preferably configured, so that the user terminal can perform access without restrictions. This is also a basis of performing the entire authentication procedure. (2) After receiving the authentication result of AuthServer in step 209, AuthProxy reconfigures a firewall rule, so that a user access from the MAC address is not limited any longer. In addition, AuthProxy maintains a mapping relationship between the token and the MAC address of the user terminal, and regularly request AuthServer to verify validity of the token. If a response indicating that the token is invalid, AuthProxy deletes a routing rule for the MAC address from the firewall rule. In this case, if the user terminal is to access an HTTP service again, the user needs to perform an authentication procedure again. Because in the portal authentication solution, AuthServer needs to return a login page, and verify the user name and the password entered by the user (for how AuthServer verifies the user name and the password, AuthServer may have an account system, or AuthServer just simply instructs the user to input the name and the phone number, and no actual authentication is performed). For the terminal, especially a mobile terminal, interaction in the procedure is complex, and is inconvenient for the user to use. Therefore, in a next implementation solution based on portal authentication, the procedure is improved, so that no login is required in the entire process by following the official account of the merchant, and the user does not need to input the user name and the password.

Figure 9:
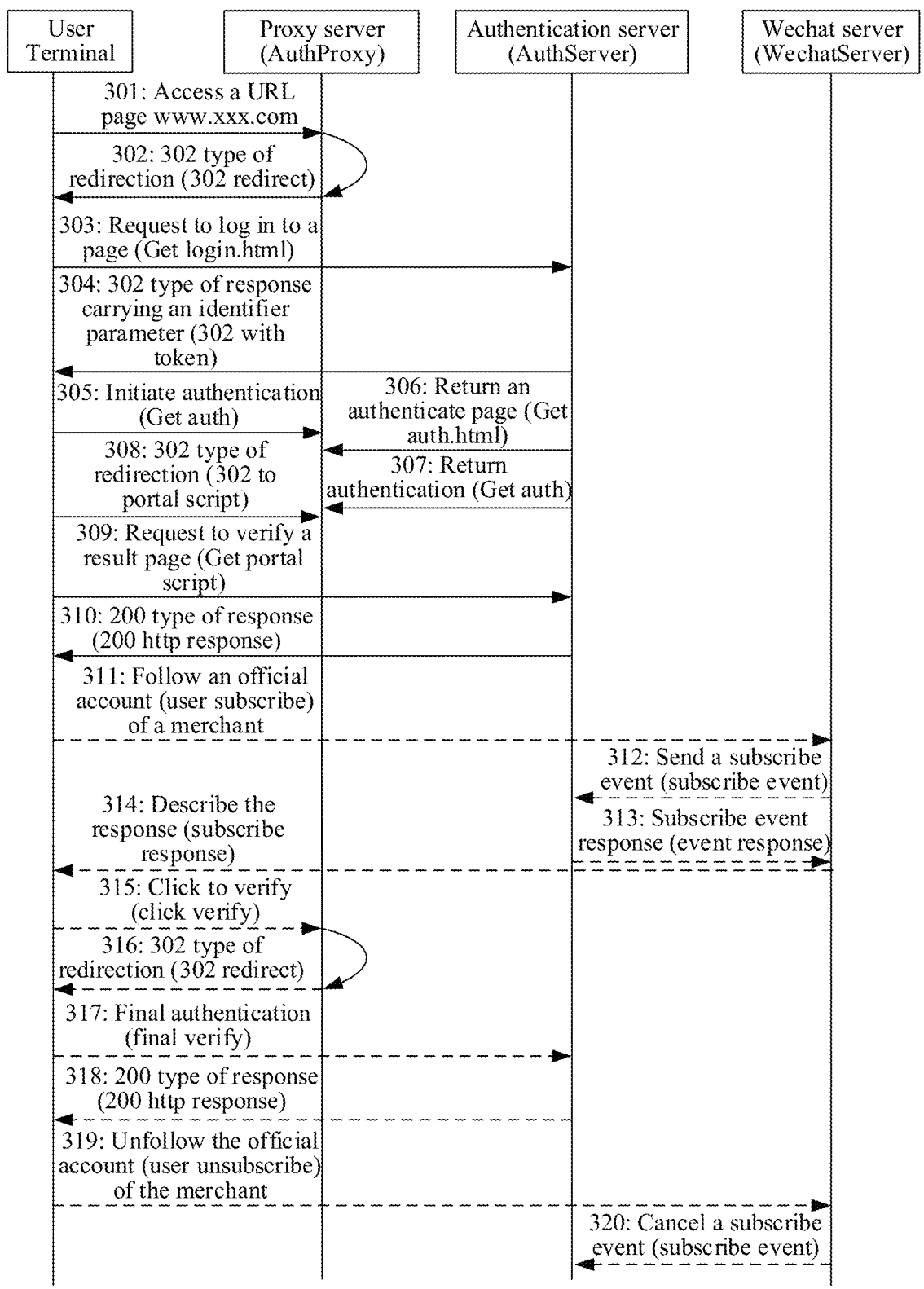
FIG. 9 is another schematic flowchart of portal-based authentication according to an embodiment of the present disclosure.

As shown in FIG. 9, FIG. 9 is a schematic diagram of implementing no login of a user by using a function of following an official account on WeChat. According to the procedure based on portal authentication shown in FIG. 9, WiFi use experience of a user is greatly improved, and the number of followers following a WeChat official account of a merchant is increased. In FIG. 9, step 301 to step 310 represent a temporary authentication procedure, step 311 to step 318 represent a procedure of following an official account, and step 319 and step 320 represent a procedure of unfollowing an official account.

Step 301: After connecting to WiFi, a user terminal initiates an HTTP request for a page www.xxx.com by using a browser, for example, automatically or manually inputting address information www.xxx.com of a to-be-accessed URL page in the browser. In one embodiment, when the user terminal is connected to the WiFi network, the user terminal may automatically activate a browser application and initiate the HTTP request for the page at a preset URL corresponding to the connected WiFi. In another embodiment, the user may manually select/enter the address information and initiate the HTTP request for any arbitrary page that the user requests to visit.

Step 302: 302 type of redirection (302 redirect).

Herein, after receiving the request, a gateway (that is, a router) routes, according to a corresponding firewall rule, the request to a port on which AuthProxy is located on the local gateway. AuthProxy provides an HTTP redirection reply, so as to redirect to a Web login page. Query String for redirection includes an ID (gwID) of the gateway, an address (gwIP) of the gateway, a port (gwPort) of the gateway, a MAC address of the user terminal, and a URL of an address of a page currently accessed by the user terminal.

Step 303: Request to log in to a page (Get login.html).

Herein, after the user terminal receives the 302 response, the user terminal requests a login page from AuthServer.

Step 304: 302 type of response carrying an identifier parameter (302 with token).

Herein, AuthServer does not return the real login page, but directly generates a temporary token. Information included in the token includes an authentication type (0 indicates unauthenticated, 1 indicates temporary authentication, and 2 indicates permanent authentication), a MAC address of the user terminal, a gateway ID (gwID), and the like. The information is calculated by means of encryption. In addition, the 302 response carrying the token is returned to the user terminal, and a mapping relationship between the MAC address and an authentication status is recorded.

Step 305: Initiate authentication (Get auth).

Herein, the user terminal uses the token to initiate an authentication request to AuthProxy.

Step 306: Return an authenticate page (Get auth.html).

Herein, AuthProxy receives the authentication request of the user terminal, and requests AuthServer to verify validity of the token.

Step 307: Return authentication (Get auth).

Herein, AuthServer returns a verification result for the token to AuthProxy. In some embodiments, the verification result is returned from AuthServer to AuthProxy as a 200 http response.

Step 308: 302 type of redirection (302 to portal script).

Herein, AuthProxy instructs the user terminal to redirect to an authentication result page of AuthServer by carrying a return code of verifying the token by AuthServer. In addition, if the authentication result indicates a verification success, AuthProxy sets a firewall rule of the gateway, so that all requests of the current user do not need to be redirected to AuthProxy.

Step 309: Request to verify a result page (Get portal script).

Herein, the user terminal initiates a request to the verification result page.

Step 310: 200 type of response (200 http response).

Herein, AuthServer displays, according to the verification result, whether the current user is authenticated or is not authenticated. If the user is authenticated, the user terminal can directly access an Internet service without using AuthProxy. That is, AuthProxy can edit the firewall rule for the local gateway such any request from the current user is no longer redirected to AuthProxy.

It can be learned from the foregoing temporary login procedure in FIG. 9 that, compared with the portal procedure in FIG. 8, there are two large differences:

(1) AuthServer does not return the login page to allow the user to input a user name and a password, but directly generates a temporary token without verifying an identity of the user. In some embodiments, the user terminal automatically handles interactions with the AuthProxy and AuthServer without any manual user input. In other words, the user terminal can automatically access and display the page requested at step 301 when steps 302-310 are completed.

(2) After this procedure is completed, the user terminal obtains an unrestricted right of accessing the WiFi within a short time. Because AuthProxy regularly requests AuthServer to verify validity of the token by using the token, after a specified time expires (such a specific time value may be configured by the merchant), if the current user still does not follow the official account of the merchant, AuthServer return a response indicating that the token becomes invalid. AuthProxy configures a firewall rule according to this response, that is, deleting the previously configured unrestricted access policy. In this case, if the user terminal continues to access a WiFi service, the user needs to perform a temporary login procedure again.

After the temporary authentication, when the user terminal uses a WiFi service, regular access interruptions occur, and temporary authentication needs to be performed again. Therefore, the user terminal can continue to perform the following procedure described below, to implement permanent authentication of the gateway on the user terminal. The procedure in FIG. 9 further includes the following steps:

Step 311: Follow an official account (user subscribe) of a merchant.

Herein, after obtaining the WIFI, the user opens WeChat to follow the official account of the merchant.

Step 312: Send a subscribing event (subscribe event).

Herein, WeChat pushes the subscribing event to Auth-Server.

Step 313: Subscribing event response (event response).

Herein, after receiving a subscribing request, AuthServer generates a piece of text and returns the text to the WeChat server. The content may include some welcome information and introduction information of the merchant. In addition, a link is further generated and included in the event response from the AuthServer to WeChat server, to prompt the user to click the link, so as to complete the permanent authentication process. The link is generated by AuthServer. Query String includes OpenID of a follower.

Step 314: Describe the response (subscribe response).

Herein, the WeChat server returns the response generated by AuthServer to the user terminal. The response may include the link and the text.

Step 315: Click to verify (click verify).

Herein, the terminal may display the welcome message and the link, and the user clicks the authentication link, to complete the final authentication procedure.

Step 316: 302 type of redirection (302 redirect).

Herein, the gateway also routes the request to AuthProxy, and AuthProxy returns, to the user terminal, a 302 response including information such as the gateway ID, the MAC address of the user terminal, and the URL accessed by the user terminal.

Step 317: Final authentication (final verify).

Herein, AuthServer updates the authentication type corresponding to the MAC address to permanent authentication by using the MAC address in QueryString requested by the user terminal, the gateway ID, and the OpenID information obtained by following the official account by the user.

Step 318: 200 type of response (200 http response).

Herein, AuthServer returns, to the user terminal, a page indicating a permanent authentication success.

After the permanent authentication procedure is completed by following the official account, (1) A state indicating permanent validity is returned when AuthProxy queries validity of the token. Therefore, AuthProxy does not delete a firewall policy/rule corresponding to the MAC address of the user terminal. In this way, after this WiFi connection, all requests do not need to pass through AuthProxy. (2) When the user terminal connects to the WiFi of the merchant next time, because the previous firewall policy may be already deleted (to avoid excessive firewall rules of the gateway, AuthProxy may check an active status of the user terminal, and regularly deletes a firewall policy corresponding to an inactive MAC address. Therefore, a temporary authentication procedure needs to be performed again. However, the token for permanent authentication is returned in the fourth step. Therefore, the user can complete the entire authentication process only by performing 302 jump for two times, and the user does not need to perform any other operation in this process.

When the user unfollows the official account, the procedure in FIG. 9 further includes the following steps:

Step 319: Unfollow the official account (user unsubscribe) of the merchant.

Herein, the user enters a detailed page of the official account of the merchant in WeChat, and taps unfollowing.

Step 320: Cancel a subscription event (unsubscribing event).

Herein, the WeChat server pushes the message of canceling the following to AuthServer. AuthServer queries the ID of the gateway device of the merchant and the user OpenID obtained by using the pushed message, and deletes corresponding authentication information from the background.

After unfollowing is performed, because the authentication information has been deleted, the user terminal needs to perform the previous temporary authentication procedure when the user terminal connects to the WiFi of the merchant next time.

A computer storage medium in an embodiment of the present disclosure may be a memory including a computer program. The computer program may be performed by a processor of a data processing apparatus, to complete the steps in the methods in the foregoing embodiments. The computer storage medium may be a memory such as a FRAM, a ROM, PROM, EPROM, EEPROM, a flash memory, a magnetic surface memory, an optical disc, or a CD-ROM, or may be any device including any one or combination of the foregoing memories, such as a mobile phone, a computer, a tablet device, a personal digital assistant.

The computer-readable storage medium stores a computer program. When run by the processor, the computer program performs the steps of the following authentication method.

Figure 10:
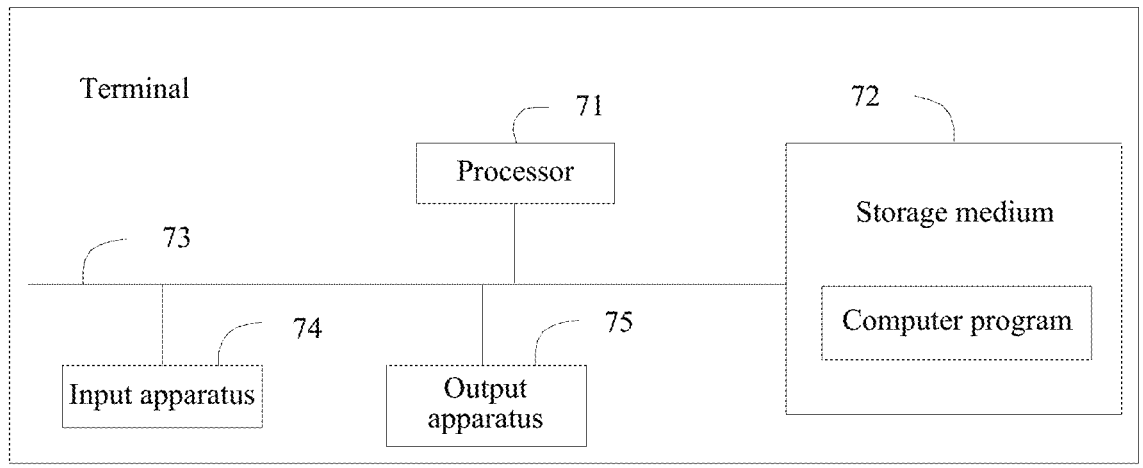
FIG. 10 is a schematic diagram of a hardware structure of a terminal according to an embodiment of the present disclosure.

When configured to perform interaction control between a terminal and a server, the computer-readable storage medium includes the following content:

As shown in FIG. 10, in addition to a processor 71 and a storage medium 72 (which can be implemented by a memory), on a side of the terminal and/or a server, a universal bus 73, an input apparatus 74, and an output apparatus 75 may further be included. The storage medium includes a computer program. When run by the processor, the computer program includes:

receiving, by an authentication server, a second request from a terminal requesting to access a redirection address, the second request carrying hardware information of the terminal, the redirection address being obtained by the terminal from a proxy server in response to the terminal initiating a first request to a to-be-accessed address on a browser page;

generating, by the authentication server, a first identification parameter according to the hardware information;

sending, by the authentication server, the first identification parameter to the terminal, wherein the terminal initiates a third request used for authentication to the proxy server according to the first identification parameter;

receiving, by the authentication server, a fourth request from the proxy server, the fourth request being an authentication request to verify validity of the first identification parameter; and informing, by the authentication server, the proxy server that the authentication request is approved when verification of the first identification parameter succeeds, wherein the proxy server facilitates the terminal to visit the to-be-accessed address in the first request.

In an embodiment, when WiFi-based authentication is to be performed, the terminal is connected to a WiFi before the terminal, obtains the to-be-accessed address input on the browser page; the first request includes the to-be-accessed address and hotspot information of the WiFi; and the second request further includes the hotspot information of the WiFi, and is configured to request a WiFi login page corresponding to the hotspot information of the WiFi from the authentication server, to perform the WiFi-based authentication.

The hardware information includes a Media Access Control (MAC) address.

The first identification parameter includes at least the MAC address and an authentication status.

In an embodiment, when run by the processor, the computer program further performs:

establishing a mapping relationship between the MAC address and the authentication status; and storing the mapping relationship in the authentication server.

In an embodiment, when run by the processor, the computer program further performs:

determining, by the authentication server, whether the MAC address and the authentication status carried in the first identification parameter is consistent with the locally stored mapping relationship between the MAC address and the authentication status;

if determining that the MAC address and the authentication status carried in the first identification parameter are consistent with the locally stored mapping relationship between the MAC address and the authentication status, generating, by the authentication server, a verification result indicating that the first identification parameter is valid, and returning the verification result to the proxy server which sends a redirection response carrying the redirection address to the terminal;

receiving, by the authentication server, a fifth request used for authentication to the authentication server directed by the redirection address; and determining, by the authentication server according to the verification result, that the first identification parameter is valid, and the authentication succeeds.

In an embodiment, when run by the processor, the computer program further performs:

after the authentication server informs the proxy server that the authentication request is approved, receiving, by the authentication server, the authentication request to verify whether the first identification parameter is invalid according to a preset condition from the proxy server, the preset condition including whether a connection time exceeds a specified time and whether the terminal follows a corresponding official account.

In an embodiment, when run by the processor, the computer program further performs:

after the authentication request is approved, if a subscribing event is generated by following an official account on a terminal application, keeping the first identification parameter valid, and maintaining the terminal in a connection state with the Internet; if the official account is not subscribed, invalidating the first identification parameter, and interrupting the connection state of the terminal.

In an embodiment, when run by the processor, the computer program further performs:

obtaining, by the authentication server, a subscribing request generated based on the subscribing event, the subscribing request carrying a terminal user identifier obtained from the subscribing event of following the official account; and obtaining, by the authentication server through query, a MAC address of the corresponding terminal according to the terminal user identifier, and updating an authentication status corresponding to the MAC address.

Figure 11:
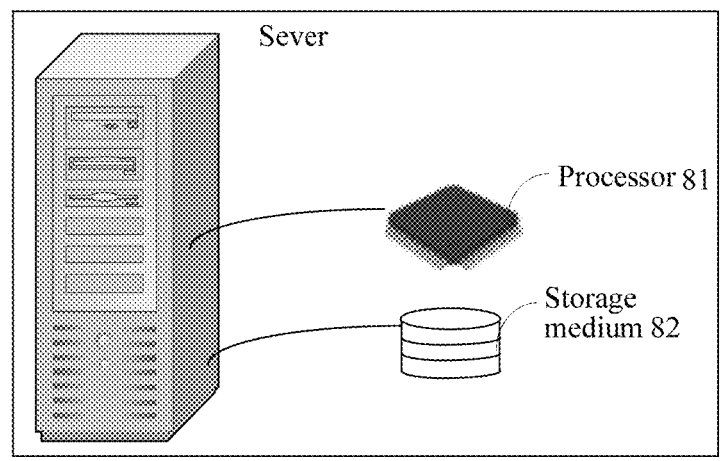
FIG. 11 is a schematic diagram of a hardware structure of a server according to an embodiment of the present disclosure.

As shown in FIG. 11, a server side includes at least a processor 81 and a storage medium 82 (which can be implemented by a memory). The storage medium includes a computer program. When run by the processor, the computer program includes:

returning a response carrying a redirection address to a terminal according to a first request, the first request being triggered by the terminal by obtaining to-be-accessed address input on a browser page;

requesting, by using the first identification parameter, an authentication server to verify validity of the first identification parameter, and approving an authentication request of the terminal when the verification succeeds.

The first identification parameter is a parameter generated according to hardware information of the terminal, and the hardware information is obtained from a second request initiated by the authentication server for the terminal.

The hardware information includes a Media Access Control (MAC) address.

The first identification parameter includes at least the MAC address and an authentication status.

In an embodiment, when run by the processor, the computer program further performs:

establishing a mapping relationship between the MAC address and the authentication status.

In an embodiment, when run by the processor, the computer program further performs:

sending the first identification parameter to the authentication server to perform verification, to obtain a verification result; returning the verification result to the terminal by using a redirection response carrying the redirection address, so that the terminal initiates, by carrying the verification result, verification to the authentication server directed by the redirection address; and determining, according to the verification result, that the first identification parameter is valid, the verification succeeding.

The verification result is a verification result indicating that the first identification parameter is valid and obtained when the authentication server determines that the MAC address and the authentication status carried in the first identification parameter are consistent with the locally stored mapping relationship between the MAC address and the authentication status.

In an embodiment, when run by the processor, the computer program further performs:

determining, by the proxy server according to a preset condition, whether the first identification parameter is invalid, the preset condition including whether a connection time exceeds a specified time and whether the terminal follows a corresponding official account.

In an embodiment, when run by the processor, the computer program further performs:

if a subscribing event is generated by following an official account on a terminal application, keeping the first identification parameter valid, and remaining in a connection state; otherwise, invalidating the first identification parameter, and interrupting a connection state.

According to the embodiments of the present disclosure, the terminal obtains a uniform resource locator (URL) of the to-be-accessed address input on the browser page, to initiate the first request. The proxy server returns the response carrying the redirection address to the terminal according to the first request, and prompts, by using the redirection response, a terminal user to redirect to a login page and perform login authentication before accessing a URL page. The terminal initiates the second request to the authentication server according to the redirection address, the second request carrying the hardware information of the terminal. For the second request, the authentication server does not return the login page to the terminal, but generates the first identification parameter for the terminal according to the hardware information. The terminal, the proxy server, and the authentication server interact with each other based on the first identification parameter, to verify the validity of the first identification parameter. When the first identification parameter is valid, the login is authenticated, so that the terminal can directly access the URL page. The embodiments of the present disclosure are applicable to a WiFi authentication scenario or another scenario in which authentication needs to be performed, for example, an authentication scenario of near-field communication or Bluetooth access. Because the login page is not returned to, there is no possibility that login account information is input based on the login page, but login authentication is implemented by using the first identification parameter, thereby simplifying an interaction manner. Therefore, the terminal user can quickly and conveniently implement an access login. In addition, an attribute of the first identification parameter is a temporary parameter. Therefore, after an effective time of the first identification parameter is exceeded, the first identification parameter is invalidated, and a login state is automatically exited.

In the several embodiments provided in the present application, it should be understood that the disclosed apparatus and method may be implemented in other manners. The described device embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as display unit may be or may not be a physical unit. That is, the units may be located in a same place, or may be distributed to many network units. Some or all of the units need to be selected according to actual requirements to implement the purpose of the solution of the embodiments.

In addition, the functional units in the embodiments of the present disclosure may be integrated into one processing unit, or each of the units may exist alone physically, or two or more units may be integrated into one unit. The integrated units may be implemented in a form of hardware, or may be implemented in a form of a software functional unit.

A person of ordinary skill in the art may understand that, some or all of steps for implementing the method embodiments may be implemented by using hardware related to a program instruction. The program may be stored in a computer readable storage medium. When the program is executed, the steps including the method embodiments are performed. However, the storage medium includes various types of media that may store program code, for example, a mobile storage device, a read-only memory (ROM), a random access memory (RAM), a magnetic disk, or an optical disk.

Alternatively, when the integrated unit in the present disclosure is implemented in the form of the software functional unit and sold or used as a separate product, the integrated unit may be stored in a computer readable storage medium. Based on such an understanding, the technical solutions of the embodiments of the present disclosure essentially, or the part contributing to the prior art may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The storage medium may be any medium capable of storing program code, such as a portable storage device, a ROM, a RAM, a magnetic disk, or an optical disk.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

INDUSTRIAL PRACTICABILITY

The embodiments of the present disclosure are applicable to a WiFi authentication scenario or another scenario in which authentication needs to be performed, for example, an authentication scenario of near-field communication or Bluetooth access. Because the login page is not returned to, there is no possibility that login account information is input based on the login page, but login authentication is implemented by using the first identification parameter, thereby simplifying an interaction manner. Therefore, the terminal user can quickly and conveniently implement an access login. In addition, an attribute of the first identification parameter is a temporary parameter. Therefore, after an effective time of the first identification parameter is exceeded, the first identification parameter is invalidated, and a login state is automatically exited. According to the embodiments of the present disclosure, an authentication login operation for a network access is simplified, and a temporary authentication state or a permanent authentication state is conveniently switched to according to a user operation, thereby greatly improving the efficiency of an authentication process.

What is claimed is:

1. An authentication method, comprising:
   receiving, by an authentication server, a second request from a terminal requesting to access a redirection address, the second request carrying hardware information of the terminal, the redirection address being obtained by the terminal from a proxy server in response to the terminal initiating a first request to a to-be-accessed address on a browser page;
   generating, by the authentication server, a first identification parameter according to the hardware information;
   sending, by the authentication server, the first identification parameter to the terminal, wherein the terminal initiates a third request used for authentication to the proxy server according to the first identification parameter;
   receiving, by the authentication server, a fourth request from the proxy server, the fourth request being to verify validity of the first identification parameter;
   informing, by the authentication server, the proxy server that the first identification parameter is valid, wherein the proxy server facilitates the terminal to visit the to-be-accessed address in the first request; and after the authentication server informs the proxy server that the first identification parameter is valid, receiving, by the authentication server, a verification request from the proxy server to verify whether the first identification parameter is invalid according to a preset condition, the preset condition including at least one of whether a connection exceeds a specified time and whether the terminal follows an official account.

2. The method according to claim 1, wherein:

when WiFi-based authentication is to be performed, the terminal is connected to a WiFi before the terminal obtains the to-be-accessed address input on the browser page;

the first request includes the to-be-accessed address and hotspot information of the WiFi; and the second request further includes the hotspot information of the WiFi, and is configured to request a WiFi login page corresponding to the hotspot information of the WiFi from the authentication server, to perform the WiFi-based authentication.

3. The method according to claim 1, wherein the hardware information comprises a Media Access Control (MAC) address.

4. The method according to claim 3, wherein the first identification parameter comprises at least the MAC address and an authentication status, and the method further comprises:

establishing a mapping relationship between the MAC address and the authentication status; and storing, by the authentication server, the mapping relationship.

5. The method according to claim 4, wherein informing the proxy server that the first identification parameter is valid comprises:

determining, by the authentication server, whether the MAC address and the authentication status carried in the first identification parameter are consistent with the mapping relationship between the MAC address and the authentication status;

if determining that the MAC address and the authentication status carried in the first identification parameter are consistent with the mapping relationship between the MAC address and the authentication status, generating, by the authentication server, a verification result indicating that the first identification parameter is valid, and returning the verification result to the proxy server which sends a redirection response carrying the redirection address to the terminal;

receiving, by the authentication server, a fifth request used for authentication from the terminal requesting to access the redirection address; and determining, by the authentication server according to the verification result, that the first identification parameter is valid and the authentication succeeds.

6. The method according to claim 1, wherein the method further comprises:

keeping the first identification parameter valid if the terminal follows the official account; and invalidating the first identification parameter if the terminal does not follow the official account.

7. The method according to claim 6, further comprises:

obtaining, by the authentication server, a subscribing request carrying a terminal user identifier obtained from the terminal's following the official account; and obtaining, by the authentication server, a Media Access Control (MAC) address of the terminal according to the terminal user identifier, and updating an authentication status corresponding to the MAC address.

8. The authentication method according to claim 1, wherein the first identification parameter includes an authentication status including at least one of unauthenticated, temporarily authenticated, and permanently authenticated, and the proxy server sets up three different firewall rules respectively directed to the unauthenticated, temporarily authenticated, and permanently authenticated status.

9. An authentication server, comprising:

a memory; and a processor coupled to the memory, the processor being configured to:

receive a second request from a terminal requesting to access a redirection address, the second request carrying hardware information of the terminal, the redirection address being obtained by the terminal from a proxy server in response to the terminal initiating a first request to a to-be-accessed address on a browser page;

generate a first identification parameter according to the hardware information;

send the first identification parameter to the terminal, wherein the terminal initiates a third request used for authentication to the proxy server according to the first identification parameter;

receive a fourth request from the proxy server, the fourth request being to verify validity of the first identification parameter;

inform the proxy server that the first identification parameter is valid, wherein the proxy server facilitates the terminal to visit the to-be-accessed address in the first request; and after the authentication server informs the proxy server that the first identification parameter is valid, receive a verification request from the proxy server to verify whether the first identification parameter is invalid according to a preset condition, the preset condition including at least one of whether a connection exceeds a specified time and whether the terminal follows an official account.

10. The authentication server according to claim 9, wherein the hardware information comprises a Media Access Control (MAC) address.

11. The authentication server according to claim 10, wherein the first identification parameter comprises at least the MAC address and an authentication status; and the processor is further configured to establish a mapping relationship between the MAC address and the authentication status; and store the mapping relationship.

12. The authentication server according to claim 11, wherein the processor is further configured to:

generate a verification result indicating that the first identification parameter is valid when determining that the MAC address and the authentication status carried in the first identification parameter are consistent with the mapping relationship between the MAC address and the authentication status; and return the verification result to the proxy server.

13. The authentication server according to claim 9, wherein the processor is further configured to:

keep the first identification parameter valid if the terminal follows the official account; and invalidate the first identification parameter if the terminal does not follow the official account.

14. The authentication server according to claim 9, wherein the first identification parameter includes an authentication status including at least one of unauthenticated, temporarily authenticated, and permanently authenticated, and the proxy server sets up three different firewall rules respectively directed to the unauthenticated, temporarily authenticated, and permanently authenticated status.

15. A non-transitory computer-readable storage medium storing computer program instructions executable by at least one processor to perform:
   receiving a second request from a terminal requesting to access a redirection address, the second request carrying hardware information of the terminal, the redirection address being obtained by the terminal from a proxy server in response to the terminal initiating a first request to a to-be-accessed address on a browser page;
   generating a first identification parameter according to the hardware information;
   sending the first identification parameter to the terminal, wherein the terminal initiates a third request used for authentication to the proxy server according to the first identification parameter;
   receiving a fourth request from the proxy server, the fourth request being to verify validity of the first identification parameter;
   informing the proxy server that the first identification parameter is valid, wherein the proxy server facilitates the terminal to visit the to-be-accessed address in the first request; and
   after the authentication server informs the proxy server that the first identification parameter is valid, receiving a verification request from the proxy server to verify whether the first identification parameter is invalid according to a preset condition, the preset condition including at least one of whether a connection exceeds a specified time and whether the terminal follows an official account.

16. The storage medium according to claim 15, wherein the hardware information comprises a Media Access Control (MAC) address.

17. The storage medium according to claim 16, wherein the first identification parameter comprises at least the MAC address and an authentication status; and the computer program instructions further cause the at least one processor to perform:
   establishing a mapping relationship between the MAC address and the authentication status; and
   storing the mapping relationship.

18. The storage medium according to claim 17, wherein the computer program instructions further cause the at least one processor to perform:
   generating a verification result indicating that the first identification parameter is valid when determining that the MAC address and the authentication status carried in the first identification parameter are consistent with the mapping relationship between the MAC address and the authentication status; and
   returning the verification result to the proxy server.

19. The storage medium according to claim 15, wherein the computer program instructions further cause the at least one processor to perform:
   keeping the first identification parameter valid if the terminal follows the official account; and
   invalidating the first identification parameter if the terminal does not follow the official account.

20. The non-transitory computer-readable storage medium according to claim 15, wherein the first identification parameter includes an authentication status including at least one of unauthenticated, temporarily authenticated, and permanently authenticated, and the proxy server sets up three different firewall rules respectively directed to the unauthenticated, temporarily authenticated, and permanently authenticated status.

* * * * *